United States Patent [19]
Stoddard et al.

[11] Patent Number: 5,708,578
[45] Date of Patent: Jan. 13, 1998

[54] PWM INDUCTIVE LOAD BRIDGE DRIVER FOR DYNAMICALLY MIXING FOUR AND TWO QUADRANT CHOPPING DURING PWM PERIOD OFF TIME

[76] Inventors: Robert J. Stoddard, 8 Willarch Rd., Lincoln, Mass. 02193; Roger C. Peppiette, 24 Woodhall Bank, Colinton, Edinburgh, Scotland, EH13OHJ

[21] Appl. No.: 678,212

[22] Filed: Jul. 11, 1996

[51] Int. Cl.[6] .................................................. H02M 7/219
[52] U.S. Cl. .................................................. 363/98; 363/95
[58] Field of Search .................................. 363/95, 98, 132

[56] References Cited

U.S. PATENT DOCUMENTS

| | | | |
|---|---|---|---|
| 3,944,907 | 3/1976 | Weit | 363/57 |
| 4,146,827 | 3/1979 | Krohn | 36/136 |
| 4,399,499 | 8/1983 | Butcher et al. | 363/48 |
| 4,454,573 | 6/1984 | Petsch et al. | 363/98 |
| 4,600,983 | 7/1986 | Petsch | 363/98 |
| 4,733,146 | 3/1988 | Hamby | 363/137 |
| 4,743,824 | 5/1988 | Anderson | 318/696 |
| 4,788,635 | 11/1988 | Heinrich | 363/37 |
| 4,908,562 | 3/1990 | Back | 318/696 |
| 5,057,765 | 10/1991 | Clark et al. | 323/288 |
| 5,585,708 | 12/1996 | Richardson et al. | 363/98 |

OTHER PUBLICATIONS

SGS–Thompson Microelectronics, (Bulletin) GS–D20M, Jun. 1994, pp. 1/14 to 14/14.

*Primary Examiner*—Jeffrey L. Sterrett

[57] ABSTRACT

A bridge for driving one phase of a stepping motor includes a PWM driver control circuit that repeatedly turns on at least one of the driver transistors. A sense voltage is produced that is directly related to the bridge load current. When a driver-control reference voltage $V_{ref}$ is applied to the driver-control input, a sense-comparator pulse is generated when the sense voltage exceeds the applied reference voltage for turning off the one driver transistor. The remaining "decay" portion of the PWM period ensues after the driver transistor turns off. A not_regulating pulse is generated during a predetermined sample time portion of each driver on-time when the load sense voltage exceeds the applied $V_{ref}$. In each PWM period, when a not_regulating pulse occurs the bridge driver is operated in the four quadrant decay mode during an initial part of the PWM-period decay portion until time $t_m$ and operating in the two quadrant decay mode for the remainder of the PWM-period decay portion. The not_regulating pulse may have a width that is directly related to the time interval during which the sense voltage exceeds the driver-control reference voltage, and the time $t_m$ may be delayed in the PWM period by an amount that is directly related to the not_regulating pulse width, and/or delayed by an amount that is inversely related to the value of the applied $V_{ref}$.

8 Claims, 27 Drawing Sheets

| DECAYING LOAD CURRENT DIRECTION AT OFF-TIME | PWM GATING | | | | | |
|---|---|---|---|---|---|---|
| | LOAD GATED | DRIVER TRANSISTORS | | | | |
| | | 30 | 31 | 32 | 33 | |
| 2-QUADRANT OPERATING MODE | CW ON | 1 | 0 | 0 | 1 | } 33 ON CONTINUOUSLY 30 CHOPPED |
| | CW OFF | 0 | 0 | 0 | 1 | |
| | CCW ON | 1 | 0 | 0 | 1 | } 30 ON CONTINUOUSLY 33 CHOPPED |
| | CCW OFF | 1 | 0 | 0 | 1 | |
| 4-QUADRANT OPERATING MODE | BETWEEN Vcc AND GROUND ON | 1 | 0 | 0 | 1 | } 30 AND 33 CHOPPED TOGETHER |
| | OFF | 0 | 0 | 0 | 0 | |

FIG. 8a $I_{cs}$
FIG. 8b $V_{cp1}$
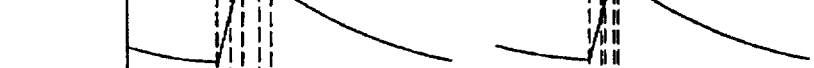
FIG. 8c $V_{RC}$
FIG. 8d $V_1$
FIG. 8e $V_2$
FIG. 8f SET
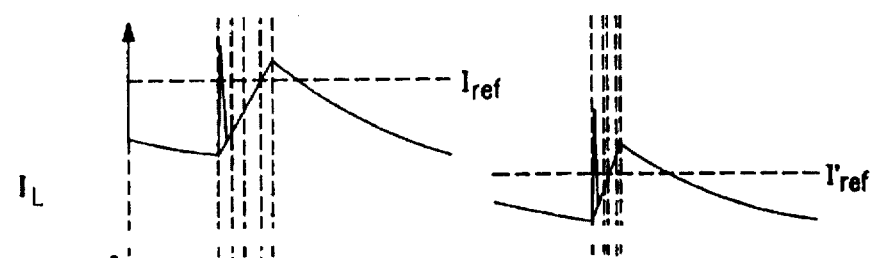
FIG. 8g $I_L$
FIG. 8h $V_3$
FIG. 8i RESET
FIG. 8j Q LATCH
FIG. 8k $V_{not\_reg}$

| RESET SIGNAL | RC TIMER OPERATING REGION | NOT_REG SIGNAL | PWM LATCH S | R | Q |
|---|---|---|---|---|---|
| 0 | BLANK | 0 | 1 | 0 | 1 |
| 0 | SAMPLE | 0 | 0 | 0 | 1 |
| 0 | CLAMP | 0 | 0 | 0 | 1 |
| 0 | OFF-TIME | 0 | 0 | 0 | 0 |
| 1 | BLANK | 0 | 1 | 0 | 1 |
| 1 | SAMPLE | 1 | 0 | 1 | 0 |
| 1 | CLAMP | 0 | 0 | 0 | 0 |
| 1 | OFF-TIME | 0 | 0 | 0 | 0 |

FIG. 11d
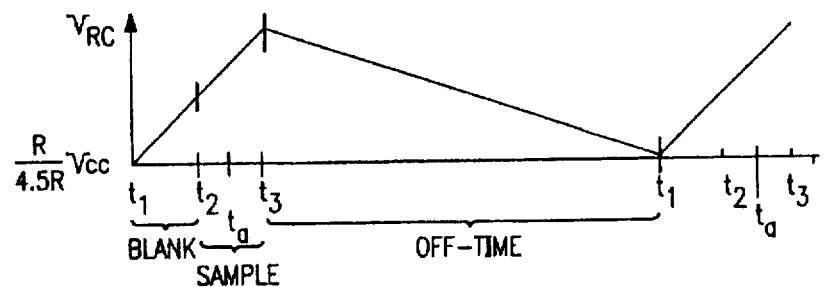
FIG. 11a
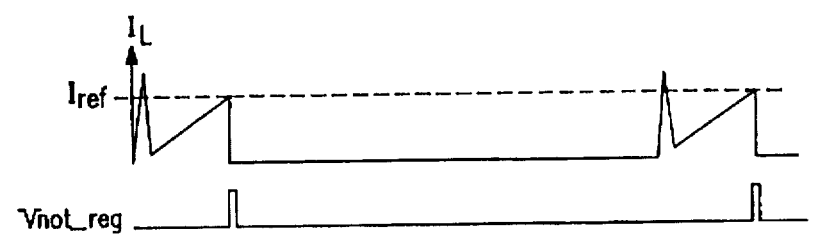
FIG. 11e
FIG. 11b
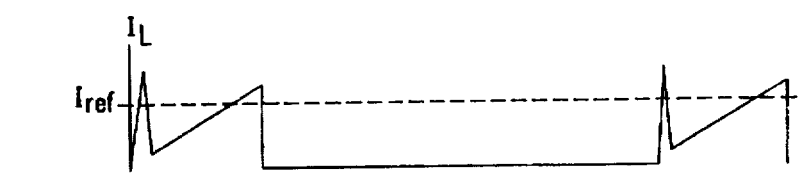
FIG. 11f
FIG. 11c
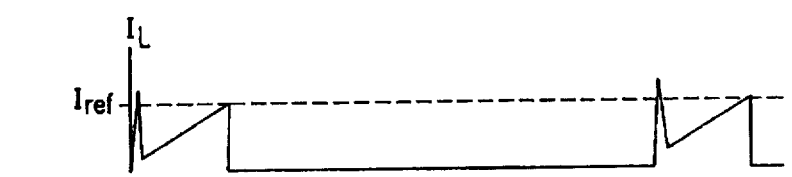
FIG. 11g

OPERATING MODES OF FIG. 12

| MODE LOGIC SIGNAL Vmode | MODE COMPARATOR OUTPUT | SOURCE DRIVER (53) | SINK DRIVER (51) | DECAY MODE |
|---|---|---|---|---|
| 0 | 0 | PWM | PWM | FAST(4Q.) |
| 0 | 1 | PWM | ON | SLOW(2Q.) |
| 1 |   | PWM | ON | SLOW(2Q.) |

FIG. 14

$$\text{BLANK TIME} = R_T C_T \ln\left(\frac{I_{cs}R_T - 0.6 V_{cc}}{I_{cs}R_T - 0.22 V_{cc}}\right) \approx \left(\frac{0.38 V_{cc} C_T}{I_{cs} = \frac{0.41 V_{cc}}{R_T}}\right)$$

$$\text{OFF-TIME} = \text{SLOW TIME} + \text{FAST TIME} = R_T C_T \ln\left(\frac{0.6}{0.22}\right) \approx R_T C_T$$

$$\begin{array}{l}\text{(4 QUADRANT)}\\ \text{FAST TIME}\end{array} = R_T C_T \ln\left(0.6\left(\frac{R_1}{R_2}+1\right)\right)$$

$$\% \text{ FAST TIME} = 100 \ln\left(0.6\left(\frac{R_1}{R_2}+1\right)\right)$$

FIG. 15

| RESET SIGNAL | RC TIMER OPERATING REGIONS | PWM LATCH OUTPUT(Q) | NOT_REG SIGNAL (Q̄) | SOURCE DRIVER (53) | SINK DRIVER (52) | |
|---|---|---|---|---|---|---|
| 0 | BLANK | 1 | 1 | ON | ON | |
| 0 | SAMPLE | 1 | 1 | ON | ON | |
| 0 | CLAMP | 1 | 1 | ON | ON | |
| 0 | OFF-TIME 1 $(t_a-t_m)$ | 0 | 1 | OFF | ON | 2 QUAD. |
| 0 | OFF-TIME 2 $(t_m-t_1)$ | 0 | 1 | OFF | ON | 2 QUAD. |
| 1 | BLANK | 1 | 1 | ON | ON | |
| 1 | SAMPLE | 0 | 0 | OFF | OFF | 4 QUAD. |
| 1 | CLAMP | 0 | 0 | OFF | OFF | 4 QUAD. |
| 1 | OFF-TIME 1 $(t_a-t_m)$ | 0 | 0 | OFF | OFF | 4 QUAD. |
| 1 | OFF-TIME 2 $(t_m-t_1)$ | 0 | 1 | OFF | ON | 2 QUAD. |

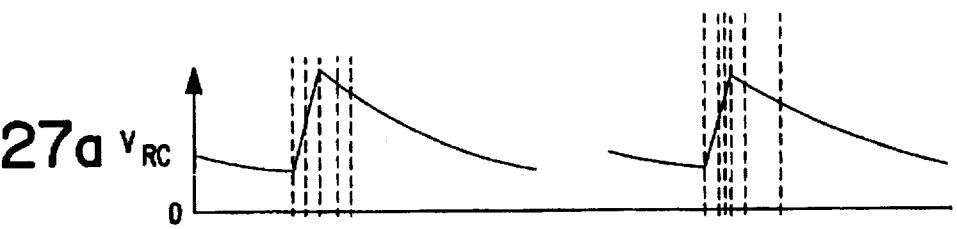
FIG. 27a $V_{RC}$
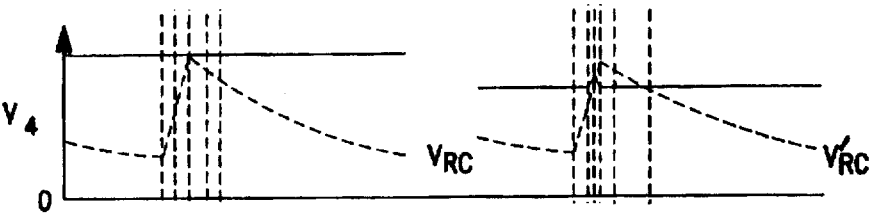
FIG. 27b $V_4$
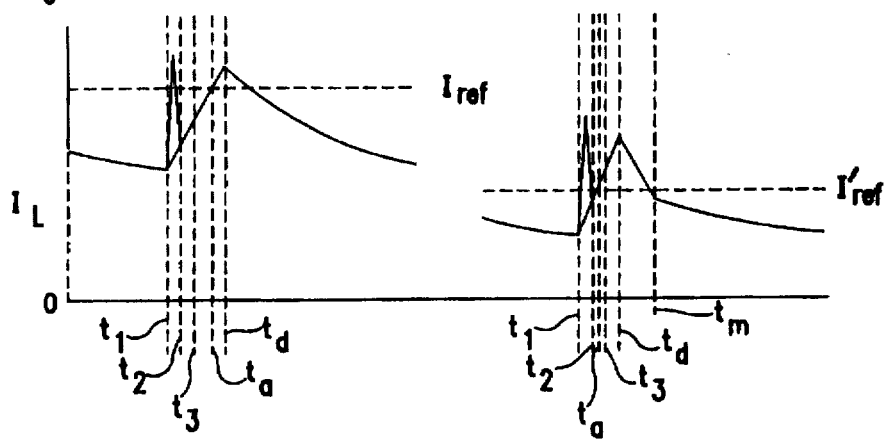
FIG. 27c $I_L$

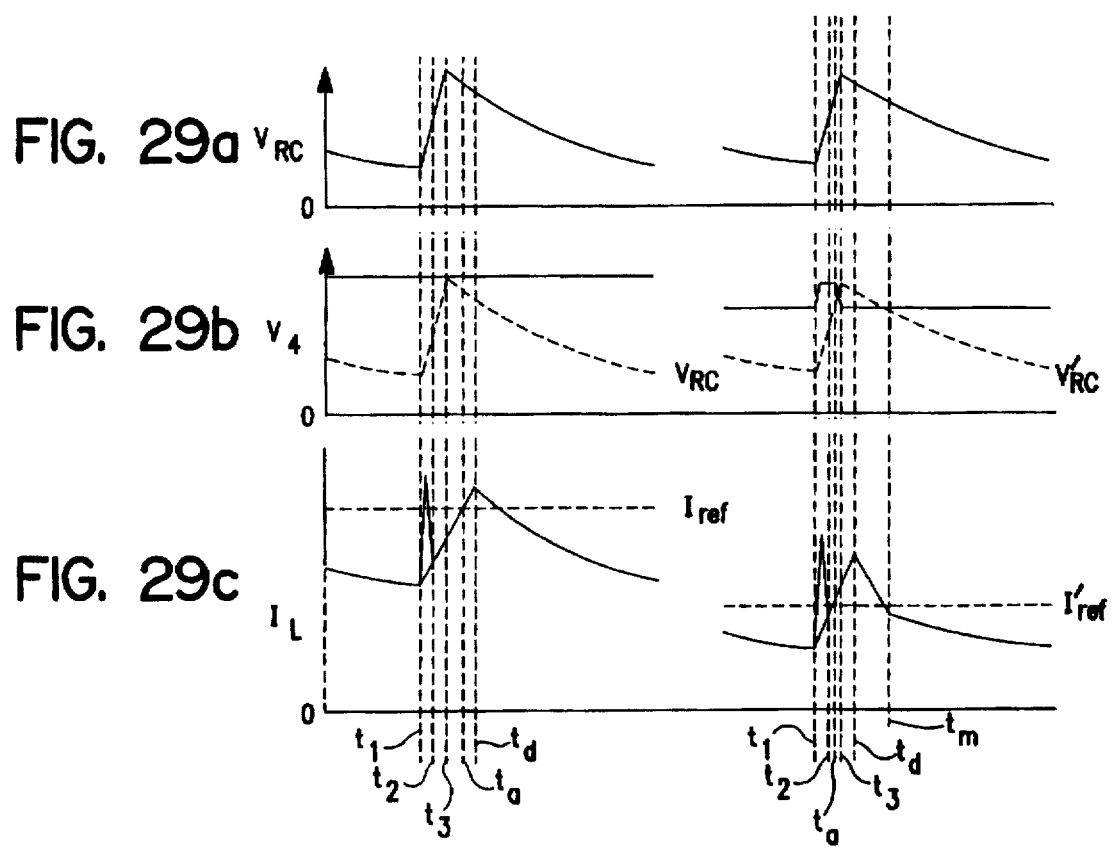

PWM INDUCTIVE LOAD BRIDGE DRIVER FOR DYNAMICALLY MIXING FOUR AND TWO QUADRANT CHOPPING DURING PWM PERIOD OFF TIME

REFERENCE TO RELATED APPLICATION

This is a Complete Application claiming the benefit of the Provisional application Ser. No. 60/001,234, filed Jul. 19, 1995.

BACKGROUND

This invention relates to a pulse-width-regulated (PWM) bridge driver for an inductive load, and more particularly to such a driver having a PWM controller providing circuit means for mixing two and four quadrant chopping during the off-time of each PWM period.

FIG. 1 illustrates the construction of a simple PWM driver of the prior art employing a single driver transistor for an inductive load to illustrate problems common to both prior art single transistor inductive-load PWM drivers and four-transistor bridge inductive-load PWM drivers. Wave forms of signals in the PWM driver of FIG. 1 are shown in FIGS. 1a, 1b, 1c and 1d.

A driver transistor 10 has a load 12 connected between the emitter and the +Vbb bus. A load-current sensing resistor 14 is connected from emitter to the ground bus, serving as a current-to-voltage transducer to produce a sensing voltage that is proportional to the peak load current, $I_L$ in FIG. 1b. The PWM control circuitry includes a timer 16 for generating timer pulses (FIG. 1a) at the set-input of a latch or latch 18. A comparator 20 has one input connected to the sensing resistor 14 and another input connected to a reference-signal input terminal 22. During operation of this PWM control circuit, timer pulses are periodically applied at times $t_1$ by the timer 16 to the set input of the set-dominated latch 18.

Each set pulse at time $t_1$ triggers the latch 18 which gates on the transistor 10, by gating pulses as in FIG. 1d. The load current through the inductive load 12, transistor 10 and sensing resistor 14 rises as governed by equation $dI/dt=(Vbb-V_{SAT}-V_{BEMF}-(I_L(Rs+R_L)))/L$, where Vbb is the load supply voltage, $V_{SAT}$ is the voltage drop across the driving transistor 10, $V_{BEMF}$ is the back electromotive force (if any), $I_L$ is the current through the inductive load 12, $R_L$ is the series resistance of the inductive load, Rs is the resistance of the sensing resistor 14, and L is the inductance of the inductive load. The load current thus rises exponentially, asymptotically approaching a value given by $(Vbb-V_{SAT}-V_{BEMF})/(Rs+R_L)$.

When at times $t_a$ the sense voltage across the sensing resistor 14 reaches the value of the reference voltage that is being applied to the PWM driver control input terminal 22, the comparator produces a reset pulse, as in FIG. 1c. Each reset pulse resets the latch, in each instance terminating gating pulses (FIG. 1d) generated from the "Q" output of latch 18. Consequently, the on-times of the PWM-controlled load current, $I_L$, and thus of the sensed current, Is, are directly related to the reference-signal input voltage, Vref, in the large region of good regulation of the load current $I_L$. Thus in this region, the average load current $I_{Lav}$ is also directly related to Vref.

Consideration must be given to the fact that, at each time $t_1$ when the transistor turns on, and before there is time for the current through the inductive load to have risen substantially, a large spike of current flows through the sensing resistor 14, tending to immediately reset the latch 18, defeating control of load current by the applied reference voltage.

In the patent to A. W. Clark and B. A. Zacker, U.S. Pat. No. 5,057,765, issued Oct. 15, 1991, there is described one method for causing the control circuit to ignore this spike. This is accomplished by generating blanking pulse from $t_1$ to $t_2$ used for blocking any reset signal from the sensing comparator reaching the reset input of a simple set/reset latch that gates on and off the driver transistor. This patent is assigned to the same assignee as is the present invention.

Alternatively, a latch 18 employed in FIG. 1 may be of the kind to be held latched on after each set pulse for a fixed time that is commensurate with the expected duration of the current spike. Such a latch is known as a set-dominated latch in which application of a reset signal is ineffective during the application of a set pulse, namely from times $t_1$ to $t_2$. The maximum pulse width of current spikes is typically half a microsecond, and in that case the width of the spike-blanking set pulse may then be conservatively fixed at one or two microseconds.

The current spike is basically attributable to the driving of an inductive load 12, comprised of an inductor 24 having an associated resistance represented by resistor 25. When using an inductive load, it is conventional to employ a fly-back diode 26 for preventing damage to the driver transistor 10 during periods just after driver transistor 10 shuts of. The flyback diode 26 then becomes forward biased and shunts the current caused by the back-voltage across the inductor 24 (additionally including the back electromotive force, BEMF, when the inductor is a motor or solenoid), and prevents a large positive back voltage from appearing at the collector of driving transistor 10. This shunted inductor current then decays until the transistor 10 turns on again. When the driver transistor 10 subsequently turns on, the inductor current just having flowed through the diode 26 leaves in the PN junction thereof a stored charge which now discharges as a spike 15 of current through the just turned on driver transistor 10 through the sensing resistor 14. Also contributing at times $t_1$ to this current spike of diode recovery charge are discharges from previously charged stray capacitances in the circuit wiring, in the collector-base junction of driver transistor 10, and capacitances across the inductive load 12 and diode 26.

As is indicated in FIG. 2, such inductive-load PWM driver circuits regulate well over a wide range of operating conditions. Over this range the average load current $I_{Lav}$, is approximately a linear function of the reference voltage Vref.

For the higher values of $V_{ref}$ the average value of the load current $I_{Lav}$ (curve 28) is displaced slightly from the ideally regulated average load current (curve 29) because PWM control actually regulates with respect to peak load current in each PWM period, the load current peak corresponding to $I_{ref}$ in FIG. 1b, where $I_{ref}=V_{ref}/Rs$. However, regulation deteriorates at low values of reference voltage, e.g. at below a certain low value of $V_{ref}$, the corresponding load current $I_{La}$ tends not to drop any longer and to remain fixed at a low current value, $I_{Leq}$. The reason for this is explained further below.

The bridge driver of FIG. 3 includes the four driver transistors 30, 31, 32 and 33, paralleled respectively by fly-back diodes 34, 35, 36 and 37. The inductive load represents one phase of a split field-winding of a multi-phase motor. Conductor branches 39 lead to other phases of split-field windings (not shown) in the same motor, each of which will be driven by another essentially identical PWM half bridge driver. PWM control circuit 38 controls the gating of the four driver transistors, ideally to regulate the average load current to follow proportionally the amplitude of the applied reference voltage $V_{ref}$ in the direction (left or right in the load of FIG. 3) as directed by the applied logic signal $V_{dir}$. The driver transistor gating logic table of FIG. 4 is for an input direction signal $V_{dir}$ that causes the load currents and decay currents to flow through the load from left to right as shown.

When the two-quadrant PWM control mode is to generate a driver-induced current in the direction from left to right through the load, either transistor 30 (or 33) is held on while transistor 33 (or 30) is PWM chopped. For the case that transistor 30 is chopped, during each chop off-time of transistor 30 the inductive voltage of the load generates a clockwise decaying current $I_{35}$ in the loop through the load, the continuously-on transistor 33, and the flyback diode 35. And when the load is a motor, there is added the BEMF voltage of the still rotating motor to the inductor voltage leading to a change in the decaying load current in each PWM period after time $t_a$ in FIG. 1b.

For the case where transistor 33 is chopped, during each chop off-time ($t_a$ to $t_1$) of transistor 33 the voltage generated by the inductive load generates a counter-clockwise decaying current $I_{36}$ in the loop through the load, the on-transistor 30, and the flyback diode 36. The rate at which the inductive load current decays is governed by the equation $dI/dt=(-V_{SAT}-V_D-V_{BEMF}(I_L(Rs+R_L)))/L$, where $V_{SAT}$ is the voltage drop across the conducting transistor, $V_D$ is the voltage across the conducting diode, $V_{BEMF}$ is the back electromotive force (if any), $I_L$ is the current through the inductive load, Rs is the resistance of the sensing resistor, and L is the inductance of the inductive load. The load current thus decays exponentially, asymptotically approaching a value given by $-(V_{SAT}-V_D-V_{BEMF})/(Rs+R_L)$.

The rate in off-time decay of the inductor current, when the chopped driver transistor of the bridge driver circuit of FIG. 3 operating in the two-quadrant mode, is nearly the same as for the single-driver transistor circuit of FIG. 1 so that the waveforms in FIGS. 1a, 1b, 1c and 1d are essentially the same for the driver circuit of FIG. 1 and for the bridge driver circuit of FIG. 3 operating in two quadrant mode.

As explained above, in the single transistor driver of FIGS. 1 and in the PWM driver of FIG. 3 operating in the two-quadrant PWM mode, the chopped driver transistor is forced to remain on after each timer pulse (FIG. 1a) for a short time $t_1$ to $t_2$ so that the driver-gating latch (e.g. 18) cannot respond to a resetting pulse attributable to a transient current spike at time $t_1$ (FIG. 1b) through the sensing resistor (e.g. 14). When during this short current-spike blanking time, $t_1$ to $t_2$, the applied $V_{ref}$ is low enough that the load current reaches the point where the sense voltage Vs just exceeds $V_{ref}$ that normally causes the resetting (FIG. 1c) of latch 18. But latch 18 is held latched and cannot control the load current. Only after the termination of the blanking time at $t_2$, will resetting occur. At this point, the lower the applied $V_{ref}$ becomes, the poorer the load current regulation becomes.

Unfortunately this fixed driver on-time $t_{on}$ ($t_1$ to $t_2$) subtracted from the PWM period between leading edges (e.g. at $t_1$ in FIG. 1a) of PWM timer pulses determines the maximum possible off-time $t_{off}$ during each PWM period. In practice the PWM timer frequency (1/PWM-period) is further limited to a minimum of 20 KHz to avoid causing audible noise. The net result is that the PWM system has a maximum driver duty cycle ($t_{on}/(t_{on}+t_{off})$).

For example, if $t_{off}$ is fixed at 20μs and the PWM timer frequency is 20KHz in a single transistor or bridge driver operated in two-quadrant PWM mode, then the PWM period $P_{PWM}=t_{on}+t_{off}=1/20 KHz=50 \mu s$.

Thus, to avoid audible noise the $t_{on}$ cannot exceed 30 μs which gives the PWM system a maximum (on-time) duty cycle of 60%.

If the fixed ton (including control loop delays and driver switching delays) is 1.5 μs then the minimum duty cycle is given by $1.5/(1.5+20) = 7\%$. These tend to be typical numbers for PWM driven small motor loads.

So, in the extreme case of applying a reference voltage $V_{ref}$ of zero volts to the PWM controller of a single transistor or to a two-quadrant PWM controlled bridge driver, then the duty cycle of the PWM controller will drop to the minimum value of 7%. When the system is first enabled, (FIG. 1b) the current will rise during the fixed on-time $t_{on}$ followed by a load current decay for the fixed off time $t_{off}$.

Typically, because it is usual to operate with a large DC supply voltage to achieve a fast load-current rise time (e.g. $t_1$ to $t_a$ in FIG. 1b), the slowly decaying load current, associated with two-quadrant PWM operation, will not fully decay before the onset of the next on time (at $t_1$). In the subsequent PWM timer periods the load current will stairstep upward as illustrated in FIG. 5 for the situation wherein DC supply voltage is turned on, the $V_{BEMF}$ is zero, and the applied reference voltage $V_{ref}$ is zero. In FIG. 5, curve 41 shows the asymptotic rate of load current increase for the on state, in the case where $V_{BEMF}$ is equal to zero. Curve 40b and 40a show the asymptotic rate of load current decrease during the four quadrant decay state, and two quadrant decay state respectively, in the case where $V_{BEMF}$ is equal to zero.

The load current PWM wave form can be seen to be a composite of these curves for the appropriate times, mode of operation, and the load current level. Eventually the system comes into equilibrium at some level $I_{Leq}$ of current which corresponds to the level of load current in FIG. 2 at which PWM is poor.

Curve 42 in FIG. 5 is the wave form of load current in the driver of FIG. 3 over a time of many PWM timer-pulse periods wherein while the reference voltage is held at zero, the driver circuit of FIG. 3 is powered up in two quadrant operation mode. This is the extreme of the low level range of reference voltages in which the load current during each PWM period, reaches the corresponding sensed current value before the set pulses have terminated. The rising load current portions in curve 42 have the same steep slope as that of curve 40 at those low levels whereas the failing load current portions in curve 42 have the same slope as that of the shallow slopes portions of the curve 40a in the corresponding time span. Thus, for either fixed frequency or fixed off-time PWM operation the load current gradually stair steps up to an equilibrium average value $I_{eq}$, in which the load current rise and fall in each PWM period are equal. This is the mechanism by which regulation of the PWM bridge load current using two quadrant operating mode PWM deteriorates at low levels of reference voltage.

A non-zero value of $V_{BEMF}$ has the effect of shifting the curves 41, 40b and 40a in FIG. 5 down by an amount equal to $V_{BEMF}$. Thus positive values of $V_{BEMF}$ will reduce the value of $I_{Leq}$, and more importantly, negative values of $V_{BEMF}$ will increase the value of $I_{Leq}$. Furthermore, if the value of $V_{BEMF}$ is negative and becomes of sufficient magnitude that $dI/dt=(-V_{SAT}-V_D-V_{BEMF}(I_L(Rs+R_L)))>0$, then the load current will no longer decrease during the two quadrant PWM off-time, but instead will increase such that it would asymptotically approach $(-V_{SAT}-V_D-V_{BEMF})/(R_S+R_L)$. A negative BEMF voltage condition commonly occurs in brush and brushless DC motors when a change in the desired direction of rotation, and thus the polarity of the applied bridge voltage, causes $V_{BEMF}$ to be negative until such time as the motors direction of rotation has reversed.

A negative BEMF voltage condition also commonly occurs when driving stepper motors because these systems have no position feedback and thus the phase lead of the rotor typically causes the BEMF voltage to be negative towards the end of each step.

With reference to FIG. 4, when the bridge driver of FIG. 3 is operated in the four-quadrant PWM control mode to drive load current in the direction from left to right through the load, transistors 30 and 33 are simultaneously PWM chopped. During each chop-off time, the inductor voltage of the inductive load generates a decaying current $I_{56}$ in the loop through the load, and the two flyback diodes 35 and 36. The rate at which the inductive load current decays in four quadrant decay mode is governed by the equation $dI/dt=(-Vbb-V_{DTOT}-V_{BEMF}-(I_L R_L))/L$, where Vbb is the load supply voltage, $V_{DTOT}$ is the total voltage drop across the two conducting diodes, $V_{BEMF}$ is the back electromotive force (if any), $I_L$ is the current through the inductive load $R_L$ is the series resistance of the inductive load, and L is the inductance of the inductive load. The load current thus decays exponentially, and would asymptotically approach a value given by $(-Vbb-V_{DTOT}-V_{BEMF})/R_L$ were it not for the reverse current blocking property of the diodes. Thus for four quadrant mode of operation of the bridge of FIG. 3, the load current decay rate is much faster than for the load current decay rate in two quadrant operating mode thus allowing the PWM circuit to regulate the load current down to a lower value of current before the minimum duty cycle of the PWM system becomes the limiting factor, than in the case of the two quadrant mode.

However, at low values of load current the high rate of decay causes the load current to decay to zero prior to the end of the off-time. The resulting load current wave form is said to be discontinuous and results in a non-linear relationship 28b at low current levels, between $V_{ref}$ and the average load current as shown in FIG. 2. While this non-linear relationship is not desirable it is better than not being able to regulate current in most systems.

Two quadrant operation has the advantage, over four quadrant operation, that much lower ripple appears in the load current leading to closer regulation for the range in which load currents are high, e.g. less off-set between the curves 28 and 29 in FIG. 2. Furthermore, because the hysteresis core losses in the inductive load are proportional to the ripple current, lower ripple current results in less heating and power loss in the load. And, two-quadrant operation results in lower switching losses in the driver since only one bridge driver transistor is PWM chopped.

It is therefore an object of this invention to provide in a PWM controlled bridge driver for an inductive load, the capability for operation in the two-quadrant operating mode except for intervals during portions of the PWM chopping off-times (load current decay times) in which four-quadrant mode operation is effected.

It is a further object of this invention to provide such a PWM controlled bridge driver having means for controlling the percentage of the off-time in each PWM period during which four quadrant operation is effected.

SUMMARY OF THE INVENTION

A bridge driver circuit is of the kind having four bridge driver transistors, and four fly-back diodes connected respectively across the four bridge driver transistors. There is included a PWM-driver control circuit means connected to the input gating elements of the four driver transistors. The control circuit means is first for periodically gating on at least one of the driver transistors for an on-portion of each PWM period to drive current through the load, and secondly for subsequently gating off the at least one driver transistor for the remaining off-portion of the PWM period. This PWM control circuit is capable of operating in the two quadrant control mode or in the four quadrant control mode, and has a mode input conductor to which a mode-control binary logic signal of one type and the other type may be applied for determining respectively whether, during any portion of each PWM period the PWM-driver control circuit is operating the driver in the two quadrant control mode or in the four quadrant control mode.

Two quadrant operation means turning on said at least one bridge-driver transistor while holding on the diagonally opposite bridge-driver transistor, e.g. chopping the at least one transistor while holding on the diagonal transistor. Four quadrant operation means simultaneously turning on and off said at least one bridge-driver transistor and the diagonally opposite bridge-driver transistor, i.e. simultaneously chopping the two mutually opposite bridge transistors.

A mode-switching means is connected to the mode input conductor of the PWM-driver control circuit means for during one part of the PWM-period off-portion producing a binary logic signal of one type and during the other part of the PWM-period off-portion producing a binary logic signal of the other type. The PWM controlled bridge is thereby enabled to operate alternately in two and four quadrant operating mode during any single PWM period.

This invention recognizes that by mixing two and four quadrant operation of a PWM controlled bridge driver during one or more PWM periods can result in good PWM regulation over a wider range of load currents while at the same time suffering little of the above-noted disadvantages of only two or only four quadrant operation each period, as in the prior art. These advantages are of special significance in many applications of PWM bridge drivers with motor loads wherein the load current may be rapidly changing between high and low ranges many times a minute. A pertinent example is in micro-stepping motor applications wherein the applied PWM reference voltage is typically a 50 Hz to 2 KHz sine wave repeatedly passing through critically important low reference voltage levels each half sine wave cycle.

This invention further includes circuit means for determining optimum times for changing during a PWM period from two quadrant operating mode to four quadrant operating mode (or visa versa), and for automatically instructing the PWM bridge control circuit to so mix, or even not to mix, the operating modes each PWM period.

BRIEF DESCRIPTION OF THE DRAWINGS

FIGS. 8a, 8b, 8c, 8d, 8e, 8f, 8g, 8h, 8i, 8j and 8k shows logic waveforms and waveforms of current and voltage in the bridge driver of FIG. 6. These waveforms are drawn to the same scale. The PWM period on the left corresponds to a moderate level of $V_{ref}$ and good regulation. The PWM period on the right corresponds to a low level of $V_{ref}$ and poor regulation.

FIG. 9 shows the wave form of voltage $V_{RC}$ across the timer capacitor during one PWM period in the circuit of FIG. 6a.

FIG. 9a shows a table of operating logic signals and corresponding operating modes for the PWM bridge driver circuit of FIG. 6a.

FIGS. 11a, 11b and 11c show for comparison, waveforms of load current in the bridge circuits respectively of FIGS. 6a, 6b and 6c, under the condition that moment $t_a$ at which load current rises to exceed the reference current $I_{ref}$ occurs during the sample time.

FIGS. 11e, 11f and 11g show waveforms for comparison of the $V_{not\_reg}$ signal in the bridge circuits respectively of FIGS. 6a, 6b and 6c, under the condition that moment $t_a$ at which load current rises to exceed the reference current $I_{ref}$ occurs during the sample time.

FIG. 11d shows the waveform of the voltage across the RC oscillator capacitor in the bridge circuits of FIGS. 6a, 6b and 6c, under the condition that moment $t_a$ at which load current rises to exceed the reference current $I_{ref}$ occurs during the sample time.

FIGS. 11a, 11b, 11c, 11d, 11e, 11f and 11g are all drawn to the same scale.

FIG. 14 shows a table of operating logic signals and corresponding operating modes for the PWM bridge driver circuit of FIG. 12.

FIG. 15 shows the relationships of four distinct times, in a PWM period for the bridge driver of FIG. 12, to bridge driver component values.

FIGS. 27a, 27b and 27c show, respectively, waveforms of the timing-capacitor voltage $V_{RC}$, of the mode-allocation-capacitor (110) voltage V4, and of the load current $I_L$, in the circuit of FIG. 26.

FIGS. 29a, 29b and 29c show, respectively, waveforms of the timing-capacitor voltage V$RC$, of the mode-allocation-capacitor (110) voltage V4, and of the load current $I_L$, in the circuit of FIG. 28.

DESCRIPTION OF THE PREFERRED EMBODIMENTS

Figure 6A:
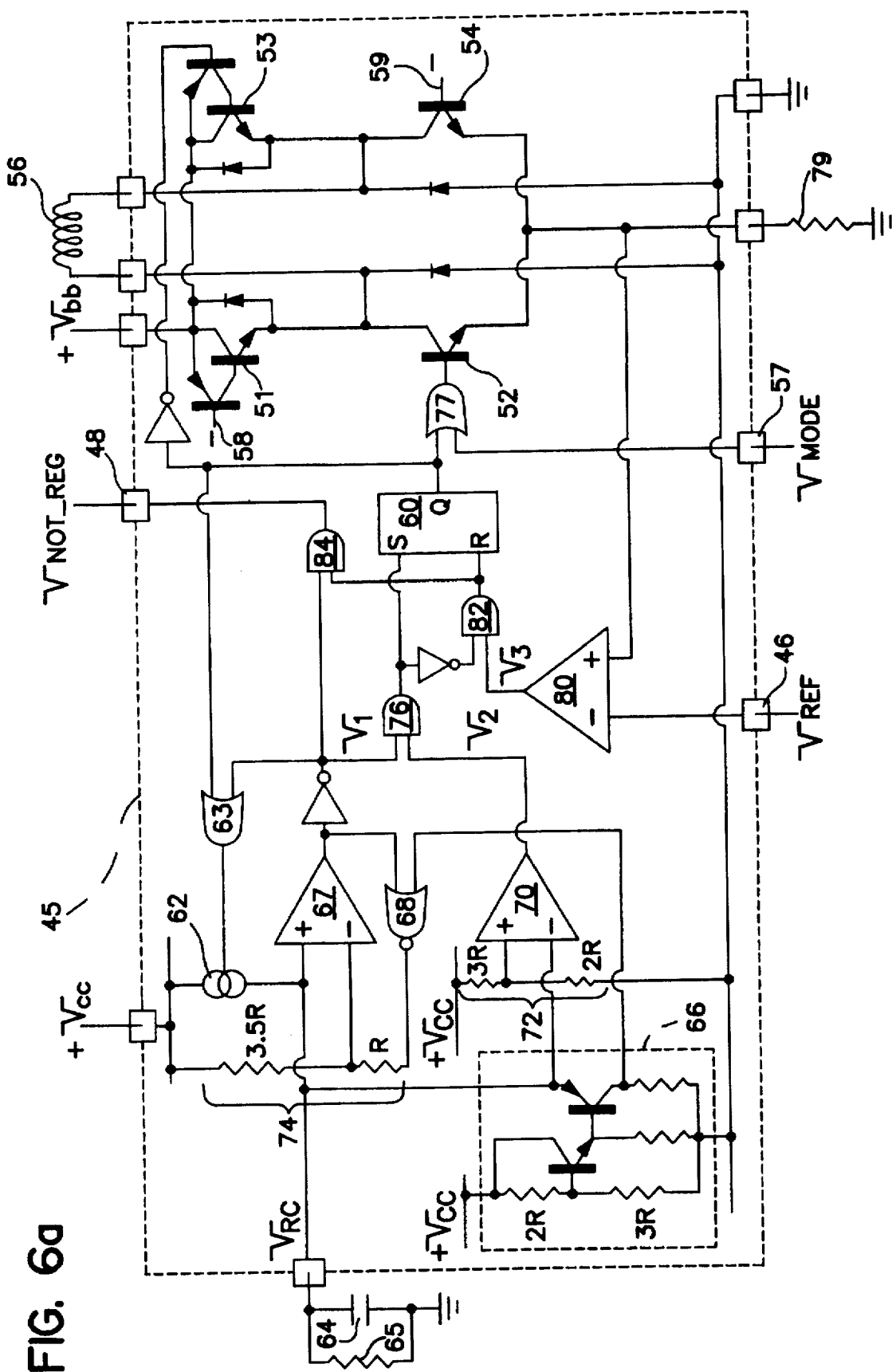
FIGS. 6a, 6b, and 6c show first, second and third integrated circuit PWM bridge drivers of this invention, each having fixed off-time type PWM bridge driver controller. They differ from each other in the logic that determines how the not_regulating signal is generated. in either of two directions through the load.
Figure 6B:
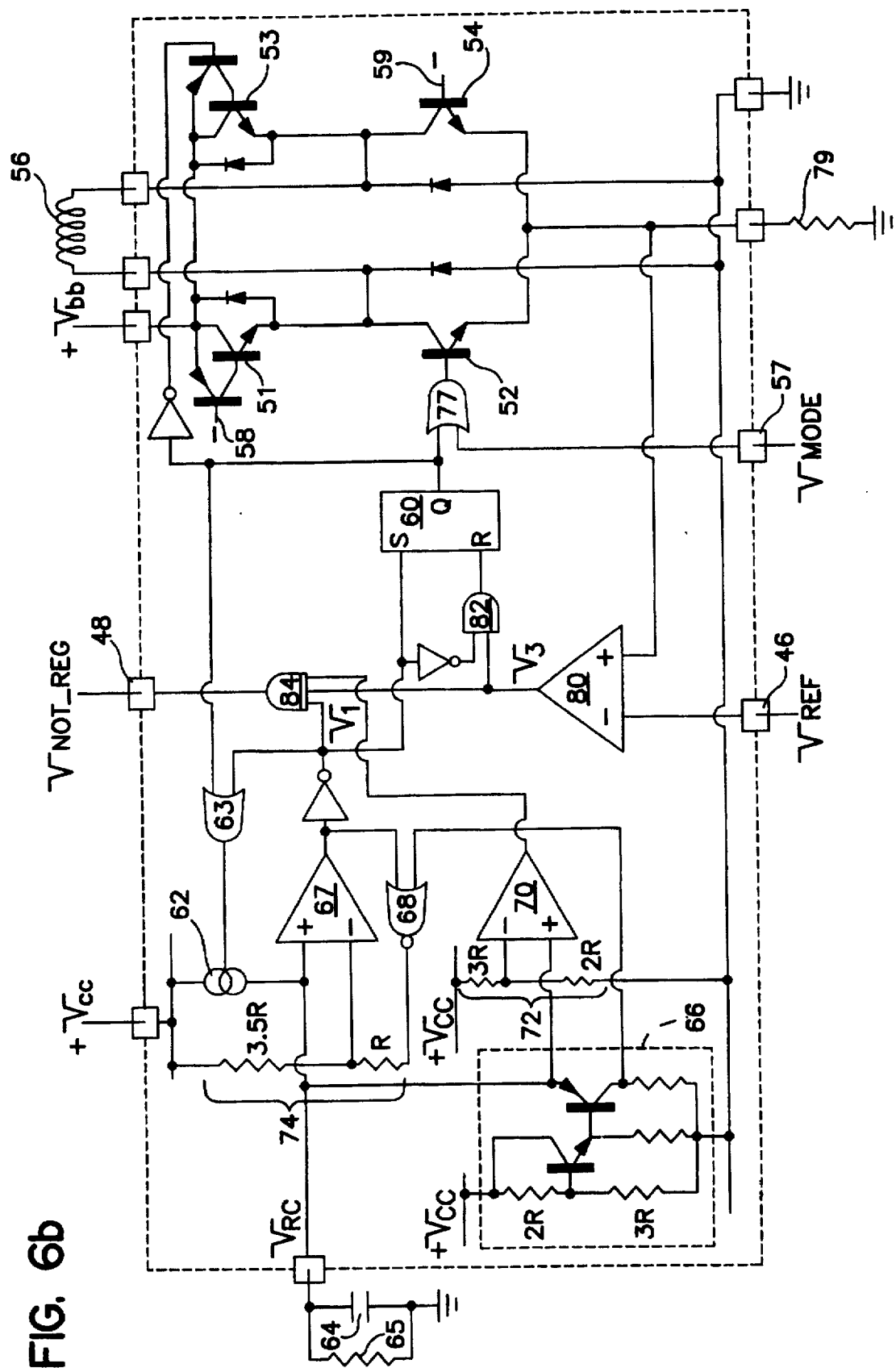
Figure 6C:
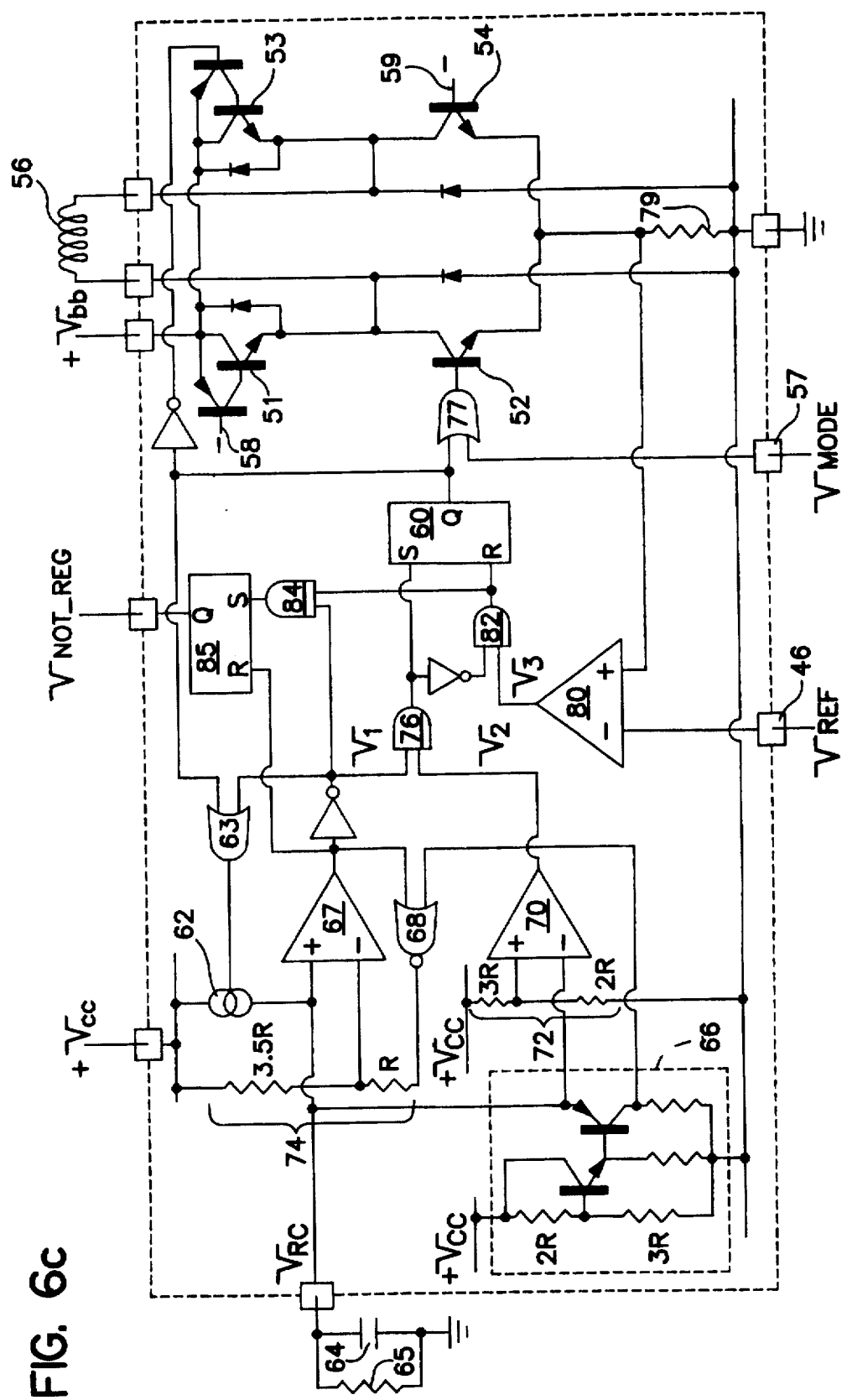

The integrated circuits in FIGS. 6a, 6b and 6c include fixed off-time bridge driver control circuits that permit a predetermined maximum amount of excessive load current to occur each PWM period, relative to a reference voltage $V_{ref}$ that may be applied at terminal pad 46, before a binary not_regulating signal pulse is produced at terminal pad 48.

The bridge has four driver transistors 51, 52, 53 and 54. For the sake of clarity the PWM driver control circuits in FIGS. 6a, 6b and 6c have been shown to control only the bridge driving transistors 52 and 53 for driving current through the inductive load 56 from right to left as shown. With the addition of the control circuitry shown in FIG. 7 the PWM control signals may be connected to the gating elements 58 and 59, as well as driving transistors 53 and 52, in such a manner to allow the PWM circuitry to control the load current bi-directionally. When a high binary signal Vmode is applied to pad 57, the bridge transistors operate in the two quadrant operating mode, i.e. transistor 52 is held on while transistor 53 is chopped by the Q output signal from the latch 60, a simple set/reset latch.

Referring now to the circuit of FIG. 6a, the AND gate 82 may let through the set pulses from the output of sensing comparator 80 but has the effect of preventing resetting of the latch 60 until the set pulse at the input latch 60 terminates, and thus the AND gate 82 renders the latch set-dominant. AND gate 84 produces a high logic signal $V_{not\_reg}$ when during the time span from $t_2$ to $t_3$ (FIG. 8) the bridge load current $I_L$ exceeds the level at which $V_s$ equals $V_{ref}$. In practice, even though at time $t_a$ when $V_s$ has risen to equal $V_{ref}$ the latch 60 is latched off, the driven bridge transistors respond by turning off after a delay time that is a direct function of the circuit propagation delays including the driving transistors switching speeds. This PWM bridge driver control circuit provides a constant off time, i.e. the time ($t_{off}$ from $t_a$ to $t_1$) in each PWM period during which the chopped driver transistor(s) is (are) off.

In FIG. 6a (and FIGS. 6b and 6c), the fixed off time $t_{off}$ is a function of the time constant $R_TC_T$ of the external resistor 65 and capacitor 64, namely $t_{off}=R_TC_T\ln(0.6Vcc/0.22Vcc)$, which for the above given resistor ratios of voltage dividers 74 and of clamp circuit 66 is very nearly equal to $R_TC_T$. One reason to adjust the charge-current ramping rate may be to adjust (e.g. upward) the above-noted delay time after $t_a$ by an (upward) adjustment of the capacitance of capacitor 64.

The wave forms shown in FIGS. 8f, 8g, 8j and 8k are respectively of the set pulse signal, the load current, the reset signal and the bridge-driver PWM gating signal from the latch 60 in the circuit of FIG. 6a.

The user of this PWM bridge control circuit may first adjust the capacitance of the external capacitor 64 to adjust the ramp rate of the oscillator $R_TC_T$ charging current in the capacitor 64. This ramp rate determines the sum of the blanking time and sample time. To allow a low value of PWM duty cycle to be achieved, the blanking time is typically set to the minimum value that avoids false tripping of the PWM latch 60.

This minimum required blanking time is largely a function of the PWM circuit delays, tolerances in the system and the switching characteristics of the driving transistors and flyback diodes. The sample time may be as short as the time required for the circuit propagation delays to produce a valid $V_{not\_reg}$ pulse but may also be of longer duration. Thus for a given semiconductor circuit the desired blanking and sample times may be determined and hence the value of capacitor 64 and pull-up current source 62 may be chosen to determine the sum of the blanking and sample times. The ratio of the resistors in the voltage divider 72 may be chosen to divide the sum of the blanking and sample times into the desired ratio of blanking time to sample time. The user may then adjust the resistor 65 to set the fixed off-time, $t_{off}$.

This PWM control circuit is described in more detail in our provisional patent application, Ser. No. 60/001,238, having become a complete patent application entitled PWM DRIVER FOR AN INDUCTIVE LOAD WITH DETECTOR OF A NOT_REGULATING PWM CONDITION, which is assigned to the same assignee as is the present invention. That patent application also describes other PWM control circuits, not presented here, that generate a $V_{reg}$_not signal, and for these reasons that application is incorporated by reference herein.

With further respect to FIG. 6a, the initiation at time $t_1$ of each set pulse (FIG. 8f) at the set input of latch 60, occurs when the current source 61 is switched on via a signal from the OR gate 63 caused by the output of the oscillator comparator 67 going low which occurs when the capacitor discharges to a voltage Vcc(R/(R+3.5R)) determined by the voltage divider 74. The switchable current-source current Ics (FIG. 8a) is turned on via OR gate 68 and begins charging the external capacitor 64. When at time $t_2$ the capacitor voltage $V_{RC}$ (FIG. 8c) reaches Vcc(3R/(3R+2R)), determined by the voltage divider 72, the output signal $V_2$ (FIG. 8e) from comparator 70 goes low and the set pulse at the input of the latch 60 goes low allowing the output of comparator 80 to reset or not to reset the latch as determined by $V_{ref}$ and the voltage across the sense element 79.

Figures 9, 9A:
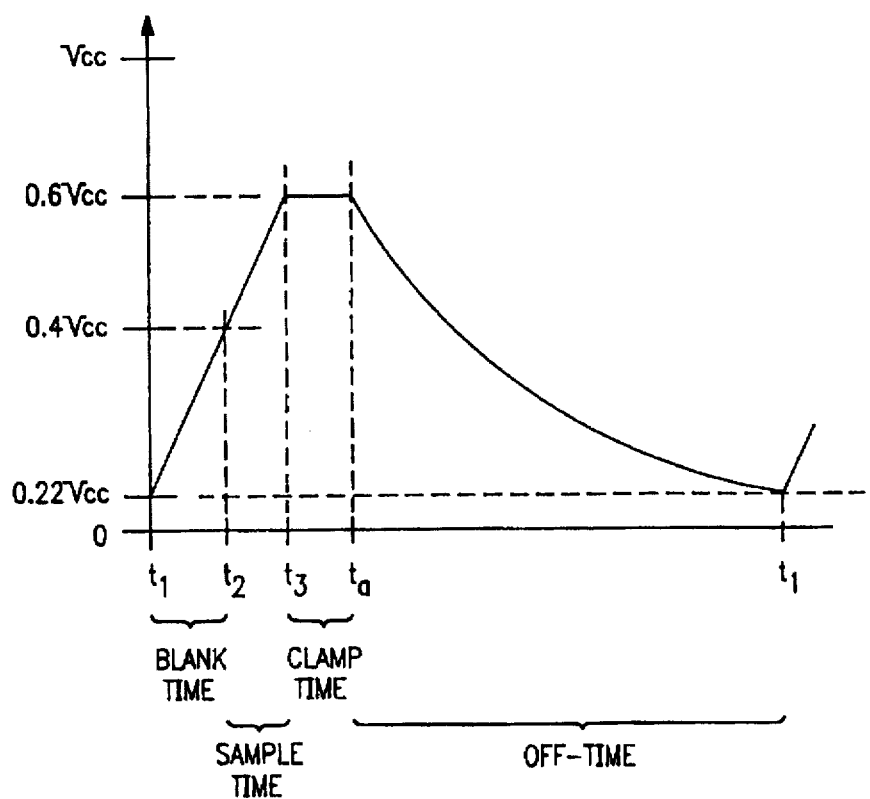

Referring to FIG. 9, the rate of the rising portion in the wave form of voltage across the capacitor 64 in FIG. 6a determines the blanking time, $t_1$ to $t_2$, and the sample time, $t_2$ to $t_3$, is simply the remaining time in which the capacitor charges to the clamp voltage of 0.6 Vcc.

Figure 7:
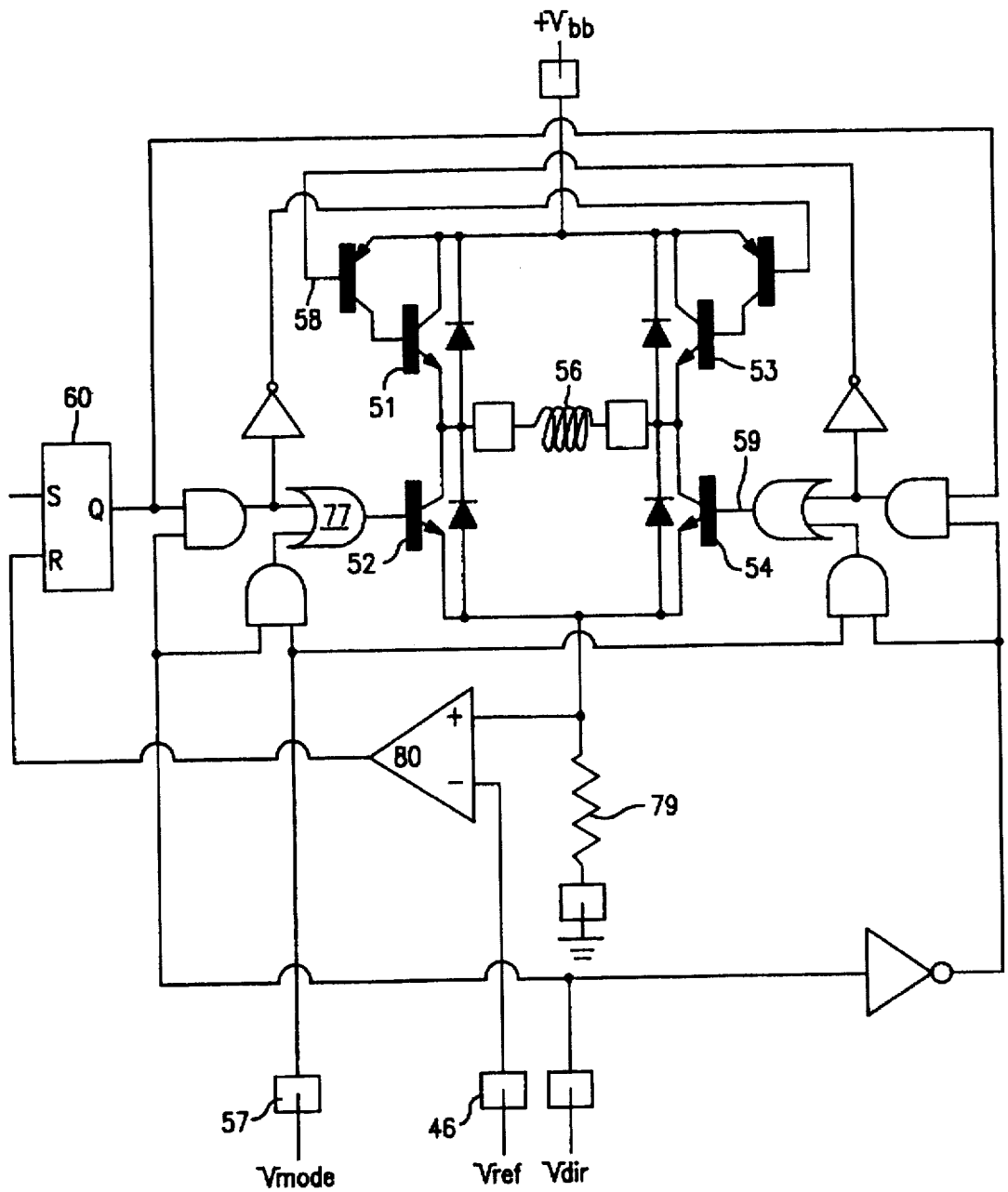
FIG. 7 shows additional circuit blocks needed to be added to the PWM controlled bridge driver of FIG. 6a to control the bridge current in either of two directions through the load.

When at time $t_3$ in the (left as shown) PWM period (FIGS. 8a–8m), $V_{RC}$ reaches clamp voltage Vcc(3R/(3R+2R)) determined by the voltage divider in the clamp circuit 66, the signal Vcp1 (FIG. 8b) from the clamp circuit 66 goes high producing a zero voltage at the output of the inverting OR gate 68 and causing the inverted output V1 of comparator 67 to go high. When at time $t_a$ the current through the sense element 79 causes the voltage on the positive input to the comparator 80 to be greater than $V_{ref}$, the comparator output goes high. Since all inputs to the AND gate 82 are high, the PWM latch is reset thereby turning off driving transistor 53. Because of circuit delays, the chopped driver transistors turn off and load current $I_L$ begins to decay at time $t_d$ after time $t_3$ as illustrated (exaggerated) in FIG. 8g. Also, when the Q output of During proper PWM regulation (waveforms in the first period shown in FIGS. 8a–8k), $V_{RC}$ remains clamped to the clamp voltage until at time $t_a$ the inductive load current (FIG. 8g) has reached the level at which the voltage across the sensing resistor 79 exceeds the applied voltage $V_{ref}$ and sensing comparator 80 produces a signal (FIG. 8h) that via AND gate 82 produces a reset signal (FIG. 8i) which resets latch 60 and turns off the PWM chopped bridge transistor(s) at time $t_b$. When the Q output of the PWM latch 60 goes low, the OR gate 63 disables the pull-up current source 62 and thus the capacitor 64 is discharged by resistor 65. After a time approximately equal to RC the voltage on the capacitor 64 will have decayed to less than Vcc(R/(R+3.5R)), establishing the PWM fixed off-time, and thus the output of comparator 67 will go high at the next $t_1$ thereby setting the PWM latch 60 and causing the PWM cycle to repeat. FIGS. 7 and 9 together give an overview of the operation of the PWM driver circuit of FIG. 6 for various situations.

When at time $t_3$ in the (right as shown) PWM period (FIGS. 8a–8k), $V_{RC}$ reaches clamp voltage Vcc(3R/(3R+2R)), the signal Vcpl (FIG. 8b) from the clamp circuit 66 goes high producing a zero voltage at the output of the inverting OR gate 68 and causing the inverted output V1 of comparator 67 to go high. The load current (second PWM period shown in FIG. 8c) reaches the level at which Vs=$V_{ref}$ before the rising capacitor voltage $V_{RC}$ reaches the clamp voltage, and $t_a$ occurs before $t_2$. Now the inverted signal $V_1$ from the output of the comparator 67 (FIG. 8d) and the signal $V_2$ from the output of the comparator 70 are combined at the input of AND gate 84 to produce a high logic pulse having a width from $t_a$ to $t_3$ in the $V_{not\_reg}$ signal (FIG. 8k) at pad 48.

In this second PWM period of FIGS. 8a–8k, the set signal (FIG. 8f) goes low at time $t_2$ which is the same time that the rest signal shown in FIG. 8i goes high. The PWM control circuitry is operating at the minimum duty cycle value. Due to the set-dominant behavior of the latch 60 in the circuit of FIG. 6a, the PWM controller will also be operating at the minimum duty cycle value, when as indicated in the second period of FIGS. 8a–8k, the time during which the load current exceeds the desired reference level ($V_{ref}$/Rs) occurs prior to the time at which the set signal goes low, $t_2$.

In the case that the load current exceeds the desired reference level at a time (sample time) between $t_2$ and $t_3$ the $V_{not\_reg}$ signal will be high from the time the load current exceeds the desired reference level until $t_3$. In this case, the set input will already be low and since output of comparator 80 is high the PWM latch may be reset immediately thereby affecting the PWM duty cycle. In such a case, the duty cycle of the PWM controller will not be at a minimum value, but instead will be at a near minimum value. Thus for the circuit in FIG. 6a, the $V_{not\_reg}$ signal indicates that the PWM duty cycle has dropped to the minimum or nearly the minimum duty cycle and as a result may be used as a signal to indicate that load current is either poorly regulated or near to the level at which the current will become poorly regulated.

Furthermore, as long as the driving transistor turn-off delays are such that the drivers turn off after the end of the sample time, the reset signal once high will remain high and thus the pulse width of the $V_{not\_reg}$ pulse can be used as an indication of how nearly the circuit is operating to the minimum duty cycle and thus how close the load current is to the level at which poor regulation will occur (i.e. the narrower the closer).

FIGS. 9a–h show waveforms in each of the PWM circuits of FIGS. 6a, 6b and 6c for the load condition that the moment $t_a$ at which load current rises to exceed the reference current $I_{ref}$ occurs during the sample time ($t_2$ to $t_3$), so that $t_a$ occurs before $t_2$.

It can be seen that the circuit of FIG. 6b is the same as that of FIG. 6a, except for the removal of the connection from the output of latch 60 to a third input of AND gate 82, the removal of the AND gate 76 and inclusion of a direct connection of the $V_1$ signal to the set input of latch 60 and a direct connection of the output of comparator 70 to an input of AND gate 84, and the addition of a connection from the output of comparator 80 to a third input of AND gate 84.

This has the major effects that, unlike in FIG. 6a, the PWM latch 60 in FIG. 6b cannot be reset until the voltage $V_{RC}$ (FIG. 11d) across oscillator capacitor 64 stops rising at $t_a$, and that during the span of time between $t_a$ and $t_3$ the load current (FIG. 11a) rises above $I_{ref}$ and the high pulse in signal $V_{not\_reg}$ (FIG. 11f) endures for this same span of time. On the other hand, under these same load conditions in the circuit of FIG. 6a, the load current (FIG. 11a) does not overshoot $I_{ref}$ and the high pulse in $V_{not\_reg}$ (FIG. 11e) is a mere impulse of no significant width.

Thus FIG. 6a has the advantage that under this load condition, the load current does not go far out of regulation, and the circuit of FIG. 6b has the advantage that under this load condition that the width of the high $V_{not\_reg}$ pulse is a measure of the degree by which the PWM controller fails to regulate.

It can be seen that the circuit of FIG. 6c is the same as that of FIG. 6a, except for breaking the connection between the output of AND gate 84 and the I.C. pad at which $V_{not\_reg}$ is generated, and adding a $V_{not\_reg}$ latch 85 that is set from the output of AND gate 84 and reset from the output of comparator 67. Thus the circuit of FIG. 6c has the advantage that under this load condition, the load current (FIG. 11c) does not go far out of regulation and the advantage that the width of the high $V_{not\_reg}$ pulse (FIG. 11g) is a measure of the degree by which the PWM controller fails to regulate.

Figure 12:
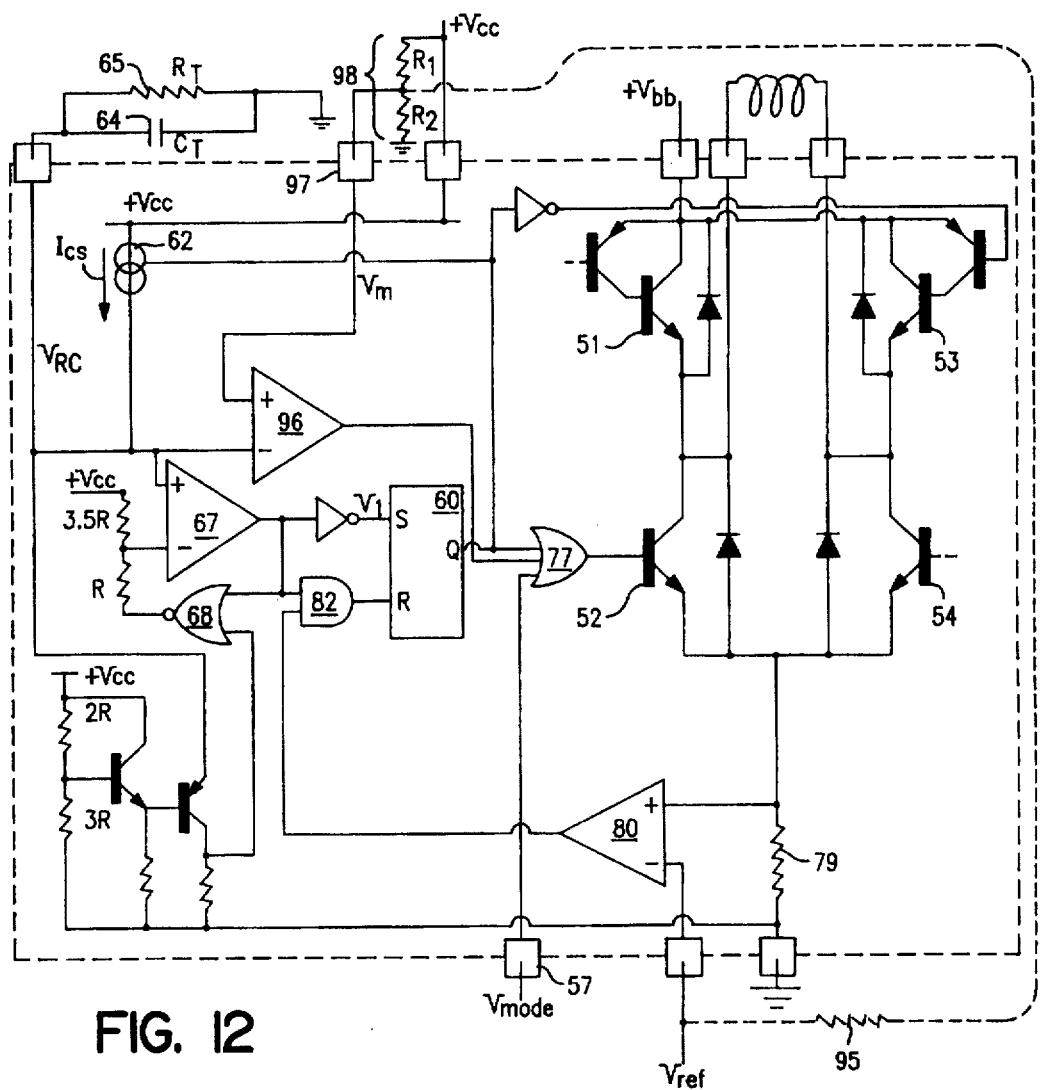
FIG. 12 shows a fourth circuit diagram of an integrated circuit bridge driver of this invention including a fixed off-time PWM bridge driver controller providing for mixed two quadrant and four quadrant operating modes in each PWM period.

The PWM controlled bridge driver of FIG. 12 includes a fixed off-time PWM controller of the same construction as in the bridge driver of FIG. 6a; except for removal of the components necessary there to provide a sample time during which a not_reg signal may be provided, i.e. sample comparator 70, voltage divider 74 and AND gates 76 and 84; and except for the addition of components that will provide for PWM operation with mixed two quadrant and four quadrant operating modes in each PWM period.

Figure 10:
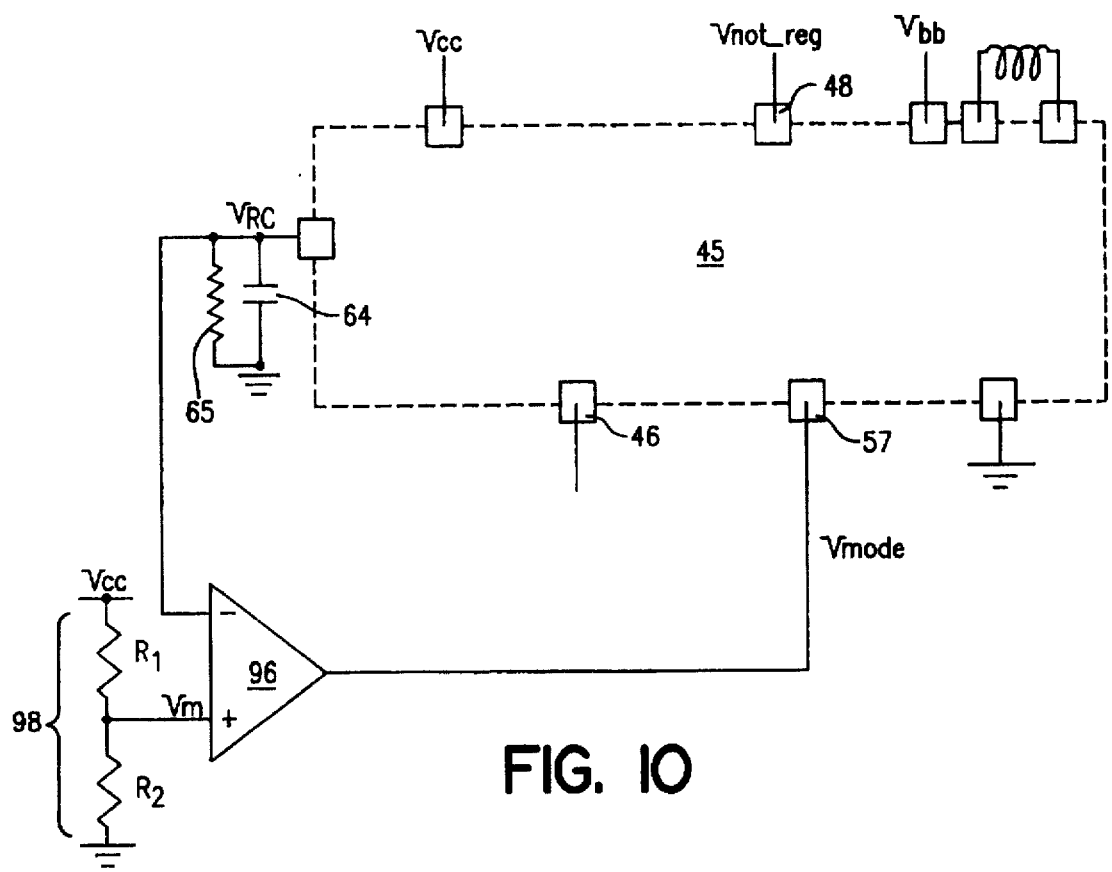
FIG. 10 shows added external components to the integrated circuit of FIG. 6a for providing one form of mixed two and four quadrant mode operation during each PWM period.

Of course, the PWM bridge circuit of FIG. 6a (and FIGS. 6b and 6c) can be made to operate with mixed two and four quadrant modes, but must be instructed to do so by applying the appropriately timed signals $V_{mode}$ to terminal pad 57. In FIG. 10, a mode comparator 96 is added externally to the integrated circuit chip 45 (of FIG. 6a) and an external voltage divider 98, made up of resistors of values $R_1$ and $R_2$, is connected to pad 97.

Similarly, the integrated circuit of FIG. 12 is the same as that of FIG. 6a, except a mode comparator 96 and a terminal pad 97 have been added, and an external voltage divider 98 is connected between Vcc and ground to provide the mode reference voltage Vm. In FIG. 12, when the timer-capacitor voltage $V_{RC}$ rises to Vm the output of the comparator 96 changes from a high to a low binary level, where Vm=$R_2$/($R_1$+$R_2$).

The inputs of comparator 96 are connected respectively to the timer capacitor $C_T$ and to the voltage divider 98 via pad 97.

In each PWM period, before the voltage $V_{RC}$ rises to the voltage Vm of voltage divider 98, the output of mode comparator 96 is high holding on via OR gate 77 the bridge driver transistor 52 while driver transistor 53 is free to be chopped by the PWM gating pulses from the output of the latch 60. When $V_{RC}$ further rises to exceed Vm, the output of mode comparator 96 goes low freeing both driver transistors 52 and 53 to be chopped by the signal from the PWM latch 60. These two states during the off-time correspond respectively to two quadrant and four quadrant mode operation. When at time $t_a$ the PWM gating pulse from the output of latch 60 goes low and turns off the bridge driver transistors, four quadrant mode operation continues for a first portion of the off-time until $V_{RC}$ drops below Vm and during the remainder of the off-time two quadrant mode operation is in effect.

For the circuits of FIG. 6a and 12, when the load exhibits no BEMF (e.g. the load is not a motor), the current will be well regulated as long as the time spent in four quadrant chop mode is greater than the minimum on-time of the PWM control circuit. When driving loads with a BEMF voltage, a larger percentage of time spent in four quadrant decay mode is typically required. In this case the motion control system can be characterized to determine the minimum four quadrant fast-decay time required to maintain good load current regulation. Appropriate values of $R_1$ and $R_2$ can then be selected. In this way the ripple current of the load will be lower than in the case of only four quadrant decay while at the same time maintaining good load current regulation under all conditions.

In FIG. 12, during the off-time the PWM controlled bridge operates first in two quadrant mode and secondly in four quadrant mode. If the input connections to the mode comparator 96 are reversed, the bridge will operate during the first portion of the off-time in two quadrant mode and in four quadrant mode during the second portion of the off-time.

The percent of the off-time during which four quadrant mode operation is in effect is determined by the voltage Vm, which in turn is determined by the voltage-divider 98 resistance values. Once the resistance values of $R_1$ and $R_2$ are established, so is the four-quadrant-mode percent.

Since it is most likely, as previously explained above, that four quadrant mode operation will be most needed at low load current levels, e.g. when $V_{reg}$ is low, the user may connect an external resistor 95 between the center tap of voltage divider 98 and the $V_{ref}$ pad, so that the percent four quadrant operation each PWM period in the circuit of FIG. 12 is inversely related to $V_{ref}$.

Figure 1:
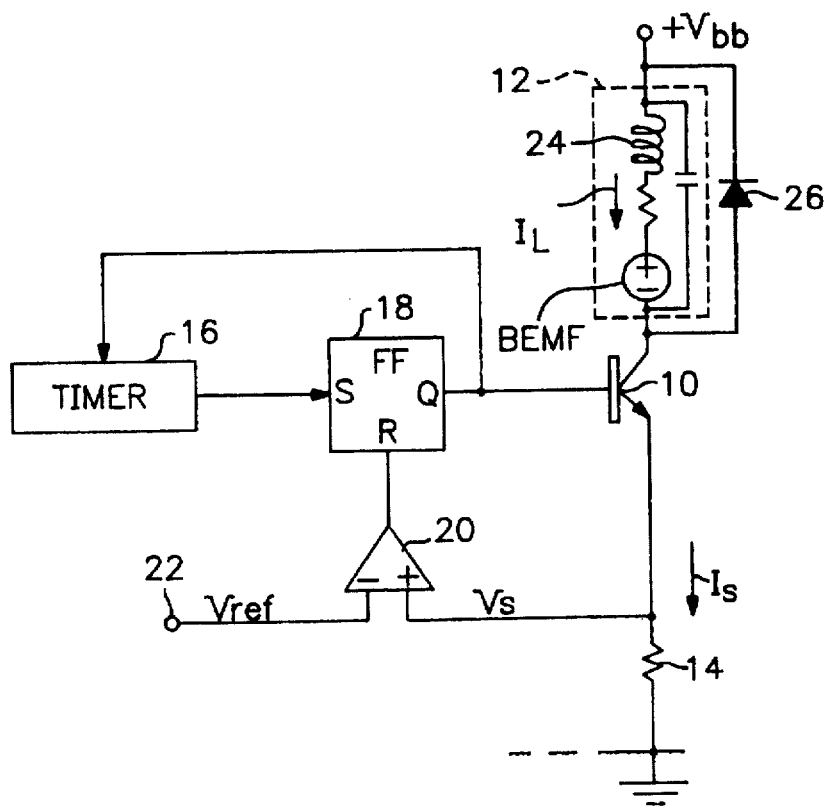
FIG. 1 shows a circuit diagram of a PWM driver of the prior art with an inductive load.
Figure 2:
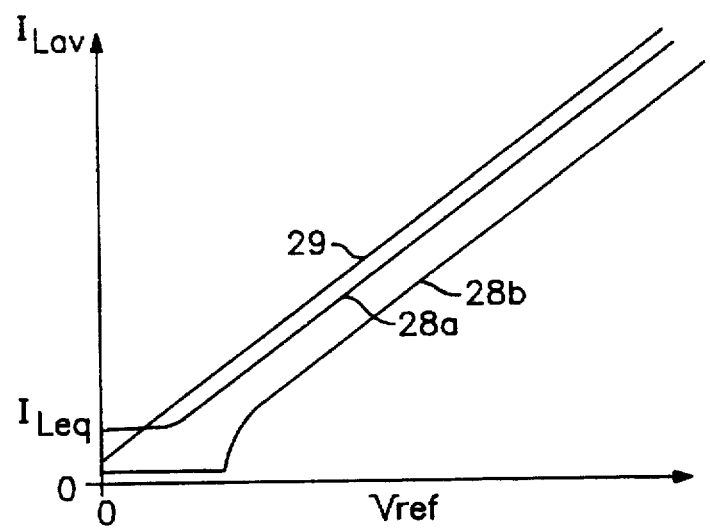
FIG. 2 shows in a graph of average load current versus the applied reference voltage, the curve 28a characterizing PWM load current regulation in the driver circuit of FIG. 1, the curve 28b characterizing the load current regulation for a bridge driver circuit operating in four quadrant decay mode, and the curve 29 characterizing the corresponding ideal PWM load current regulation.
Figure 1A:
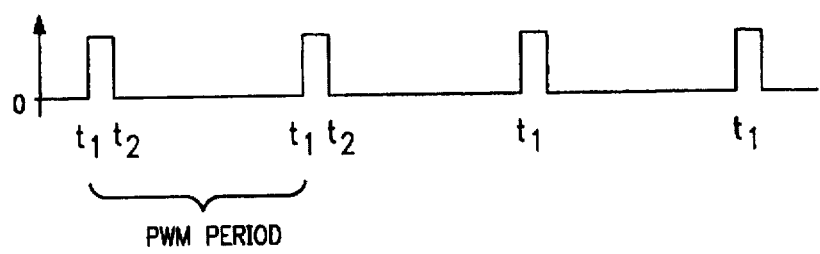
FIG. 1a shows a waveform of the timer signal including set pulses for periodically setting the latch in the driver of FIG. 1.
Figure 1B:
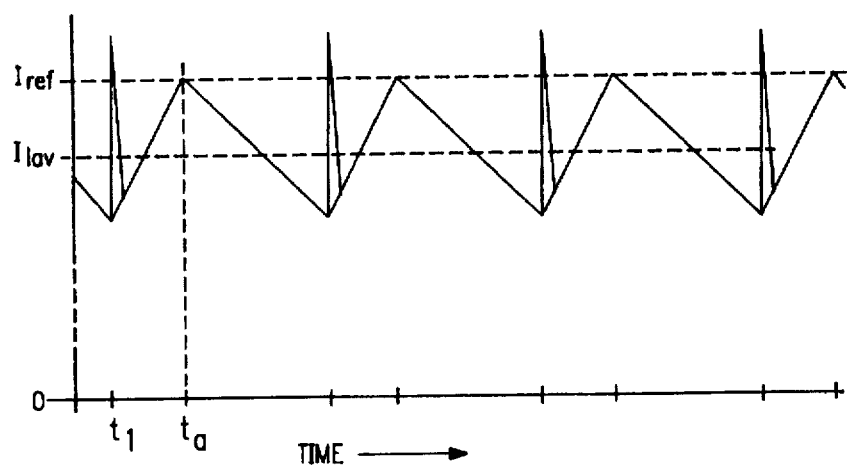
FIG. 1b shows a waveform of the load current having superimposed thereon the sensed-current spikes coincident with the leading edges of the respective set pulses, in the driver of FIG. 1.
Figure 1C:
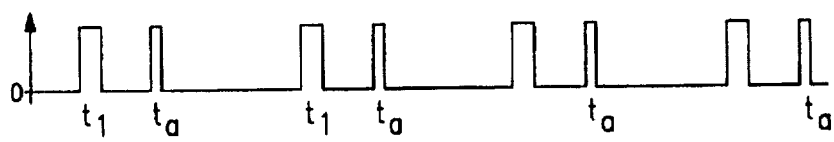
FIG. 1c shows a waveform of the reset signal at the output of the comparator in the driver of FIG. 1.
Figure 1D:
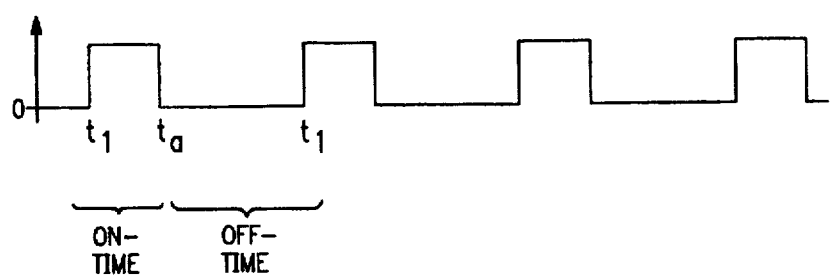
FIG. 1d shows a waveform of the latch output signal including gating pulses for turning on the driver transistor in the driver circuit of FIG. 1.
Figures 3, 4:
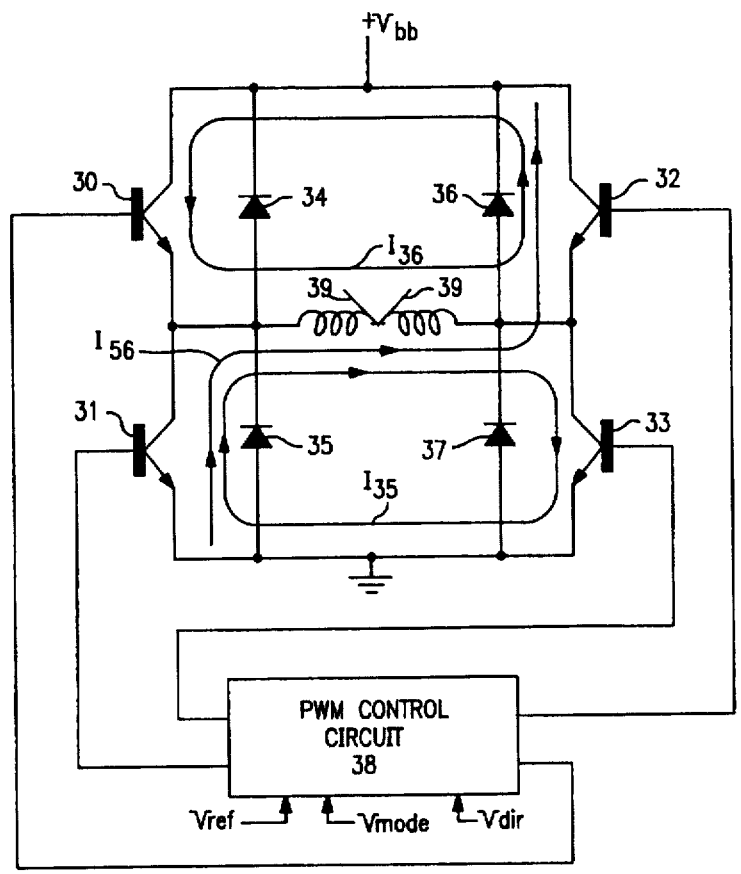
FIG. 3 shows a circuit diagram of a prior art PWM bridge driver with an inductive load.
FIG. 4 shows a table of the status of operation at several points in the bridge circuit of FIG. 3 for both two and four quadrant PWM operation modes.
Figure 5:
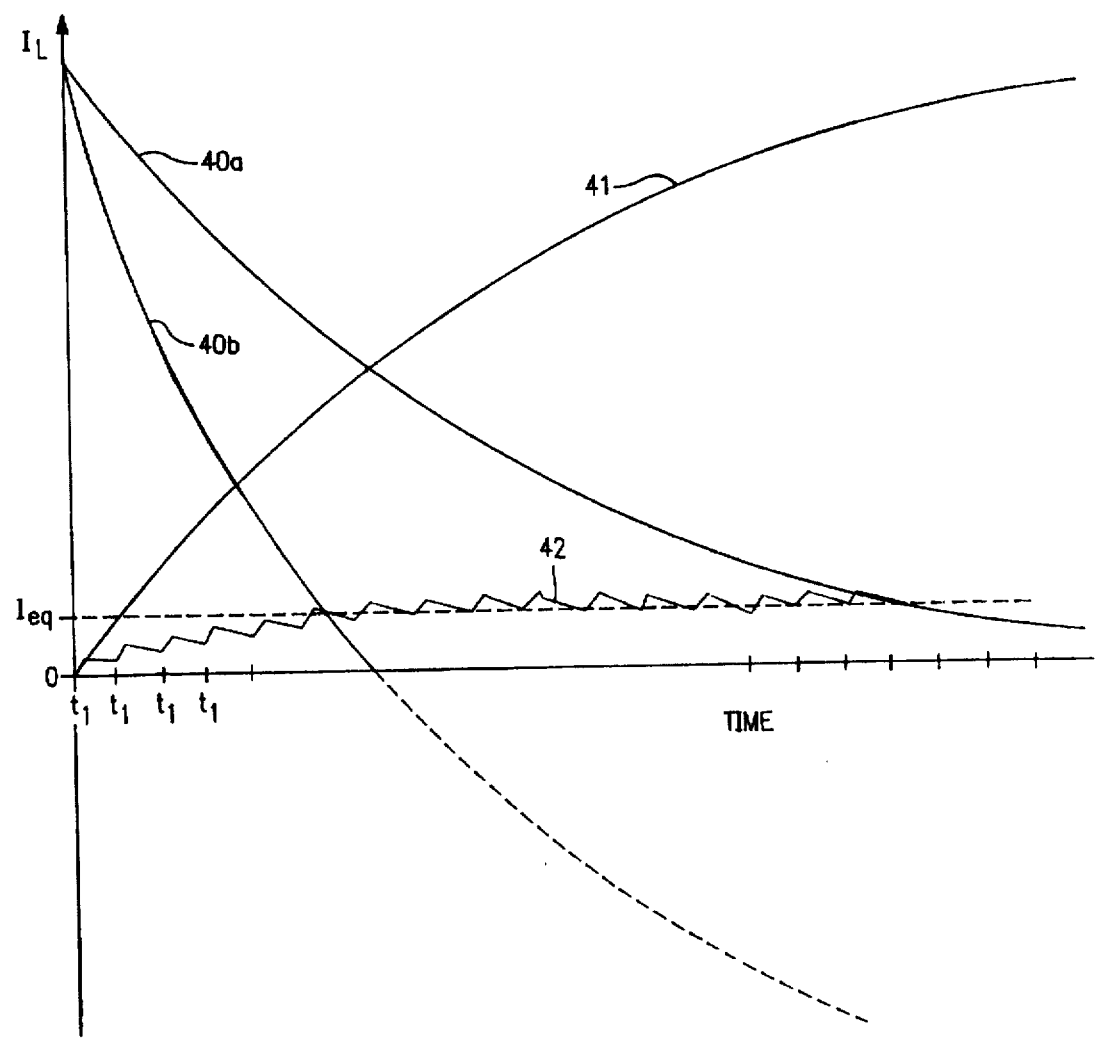
FIG. 5 shows a composite graph of characteristic exponentially rising and falling load currents in the prior art PWM driver circuit of FIG. 3 and a related driver load-current wave form for two quadrant PWM operating mode with $V_{ref}$ held at zero volts.
Figure 13:
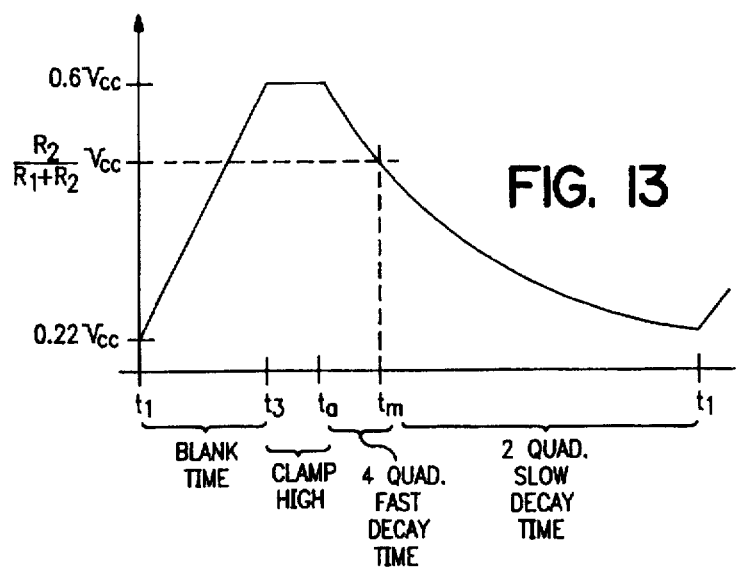
FIG. 13 shows the wave form of voltage across the timer capacitor during one PWM period in the circuit of FIG. 12.

Referring to FIG. 13, during the period from $t_a$ to $t_m$, the output from mode comparator 96 remains low. PWM gating pulses from the output of latch 60 are driving both sink driver transistor 52 and source driver transistor 53 in four quadrant mode. Thus during the off-time in this PWM period the decaying load current flows from Vbb to ground decaying quickly. When at time $t_m$, $V_{RC}$ falls to the voltage Vm, the output from mode comparator 96 goes high. For the remainder of the off-time in this PWM period driver transistor 52 is held on—operating in two quadrant mode—whereby decaying load current flows in a counter clockwise direction through the held-on transistor 52. See FIGS. 3 and 4.

Figure 16:
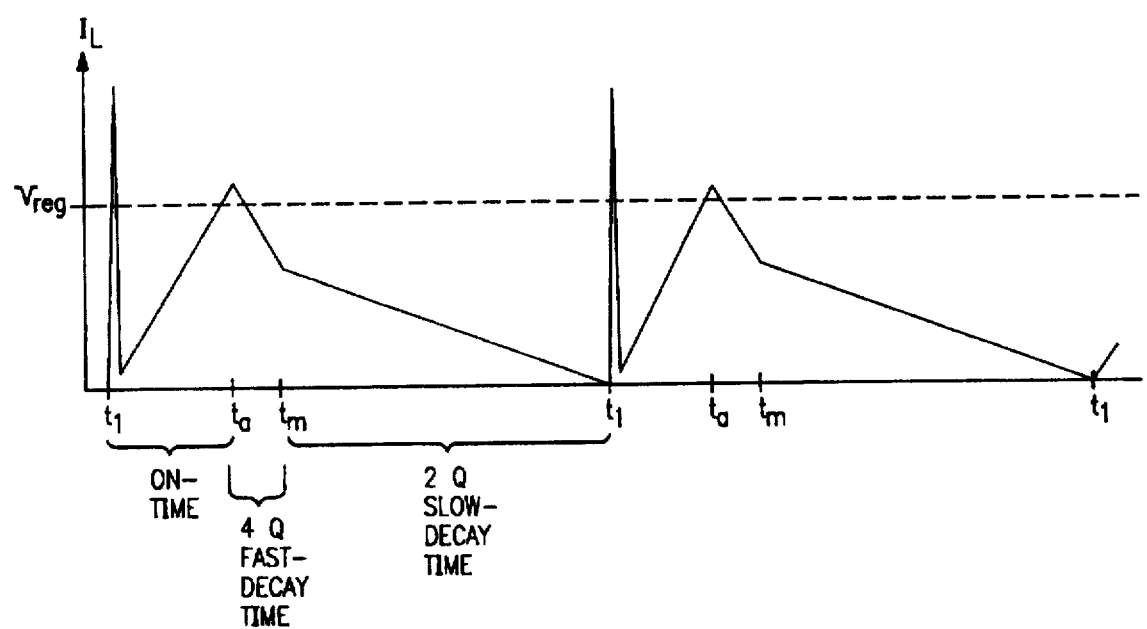
FIG. 16 shows the wave form of the load current in the bridge driver of FIG. 12 during PWM periods of mixed two and four quadrant operation.

It is therefore seen that in this one PWM period, the PWM controlled bridge circuit of FIG. 12 operates, as may that of FIG. 6a, in a mix of two and four quadrant mode as indicated in the chart of FIG. 13. The resulting wave form of load current in this PWM period is illustrated in FIG. 16 in which four quadrant operation occurs in a first portion of the off-time and two quadrant operation occurs in the second portion of off-time.

Further it may be useful, under certain conditions of drive and load, to apply a high logic signal to integrated circuit pad 57 of the integrated circuit of FIG. 12, whereby the driver will operate only in two quadrant mode for lowest ripple, acoustic noise and power dissipation.

Figure 17:
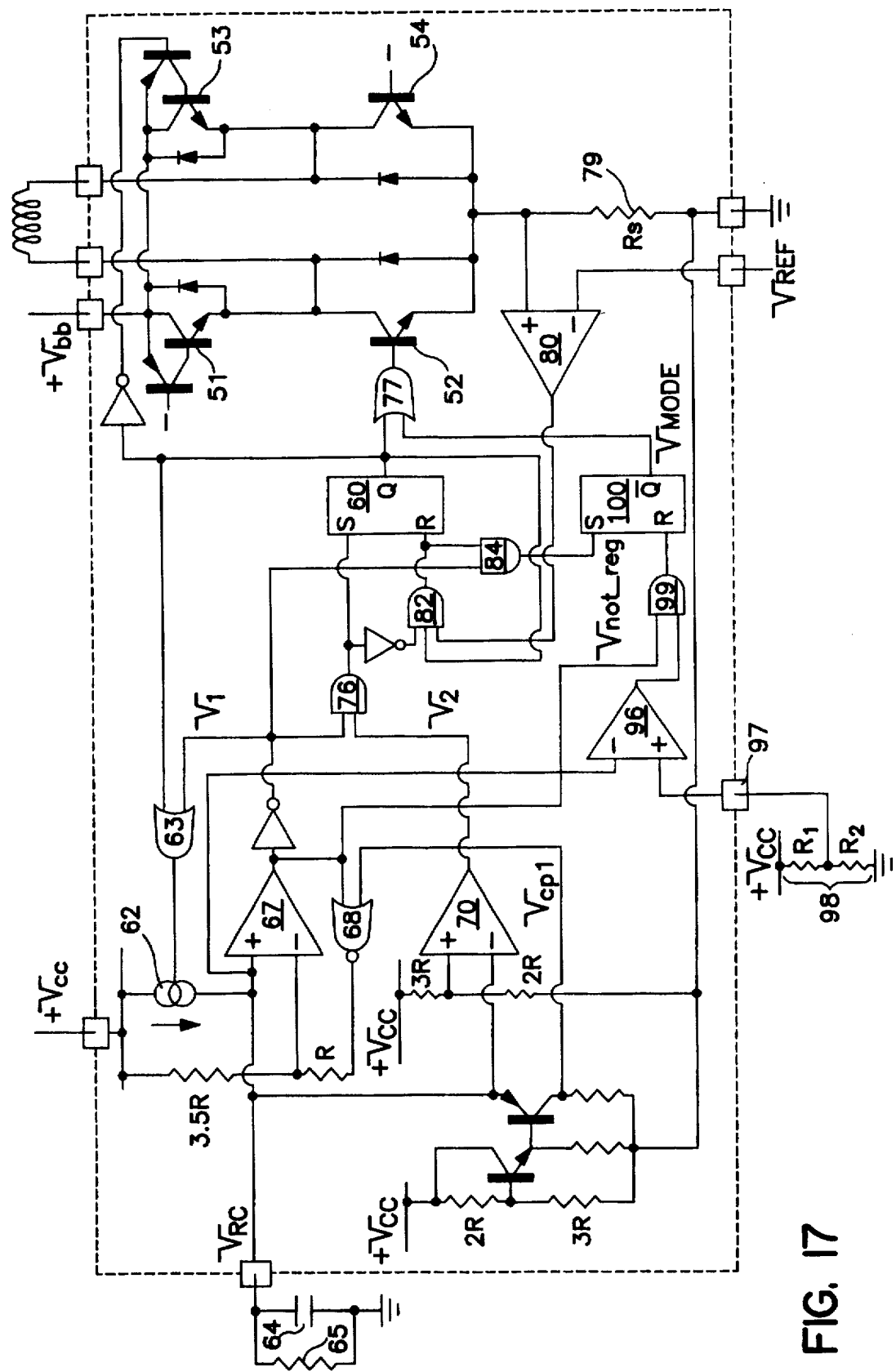
FIG. 17 shows a fifth circuit diagram of an integrated circuit bridge driver of this invention including a fixed off-time PWM bridge driver controller providing for the automatic mixing of two quadrant and four quadrant operating modes in each PWM period.

The PWM controlled bridge driver of FIG. 17 includes a fixed off-time PWM controller of the same construction as in the bridge driver of FIG. 6a except for the addition of components, namely mode comparator 96 and an external voltage divider 98 that is connected to pad 97; and except for the further addition of an AND gate 99 and mode latch 100; which additions will additionally provide for PWM operation with automatic mixed two quadrant and four quadrant operating modes in each PWM period.

A high signal $V_1$ during ramp up of $V_{RC}$ (from $t_3$ to $t_1$) is used to enable AND gate 84 to produce a high not_ regulating pulse beginning whenever during the sample time $t_2$ to $t_3$ that the load current exceeds $I_{ref}$ ($V_{ref}/Rs$). The $V_{not\_reg}$ pulse terminates when at $t_3$, $V_1$ goes low, but sets the mode comparator 100 and its output goes low, enabling four quadrant PWM operation of the bridge.

Figures 18, 19:
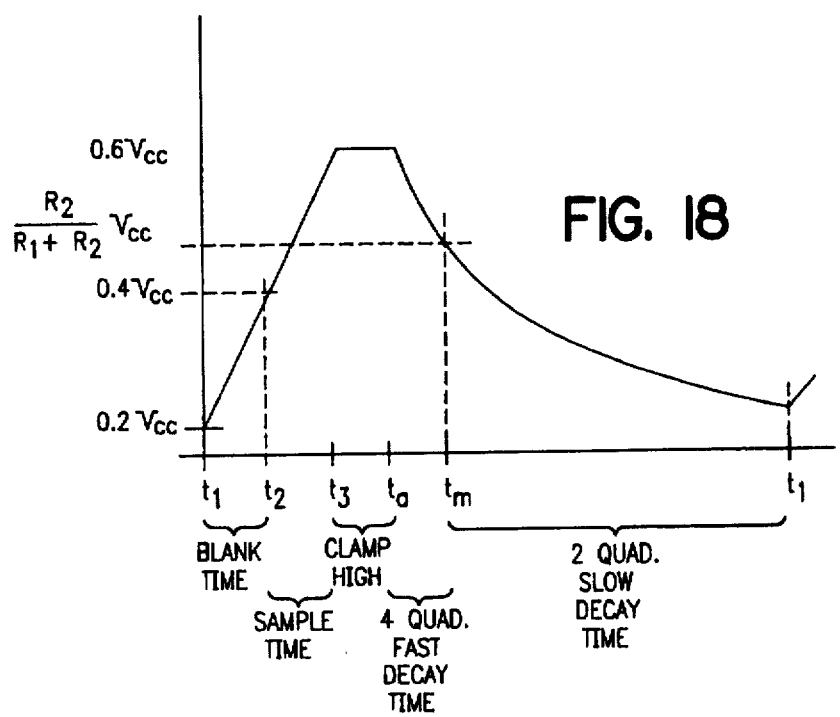
FIG. 18 shows the wave form of voltage across the timer capacitor during one PWM period in the circuit of FIG. 17.
FIG. 19 shows a table of operating logic signals and corresponding operating modes for the PWM bridge driver circuit of FIG. 17.

As is the PWM bridge driver of FIG. 12, in each PWM period the mode comparator 96 goes high at time $t_m$ when $V_{RC}$ decays to below the voltage Vm established by the voltage divider 98. See FIG. 18. Referring to FIG. 19, this logic high from comparator 96 is passed through AND gate 99 to reset mode latch 100 and to begin operating the bridge in two quadrant mode. Thus during a first portion ($t_3$ to $t_m$) of the off-time operation is four quadrant mode, and in a second portion ($t_m$ to $t_1$) of the off-time operation is two quadrant mode.

When in the driver of FIG. 17 during any PWM period, poor PWM regulation occurs, there is generated a high $V_{reg\_not}$ pulse during sample time. The high $V_{not\_reg}$ pulse sets latch 100 and initiates an interval of four quadrant mode operation that is terminated by the high signal from the mode comparator 96 at time $t_m$.

Thus, in the PWM bridge driver of FIG. 17, in each and every PWM period in which poor regulation is detected, a mixed two quadrant and four quadrant modes operation automatically ensues to immediately restore good regulation. And, as in the PWM bridge driver of FIG. 12, the percent of four quadrant mode operation that occurs in a PWM period is adjustable by varying the resistor values of voltage divider 98 for optimum PWM performance for any particular load.

Figure 20:
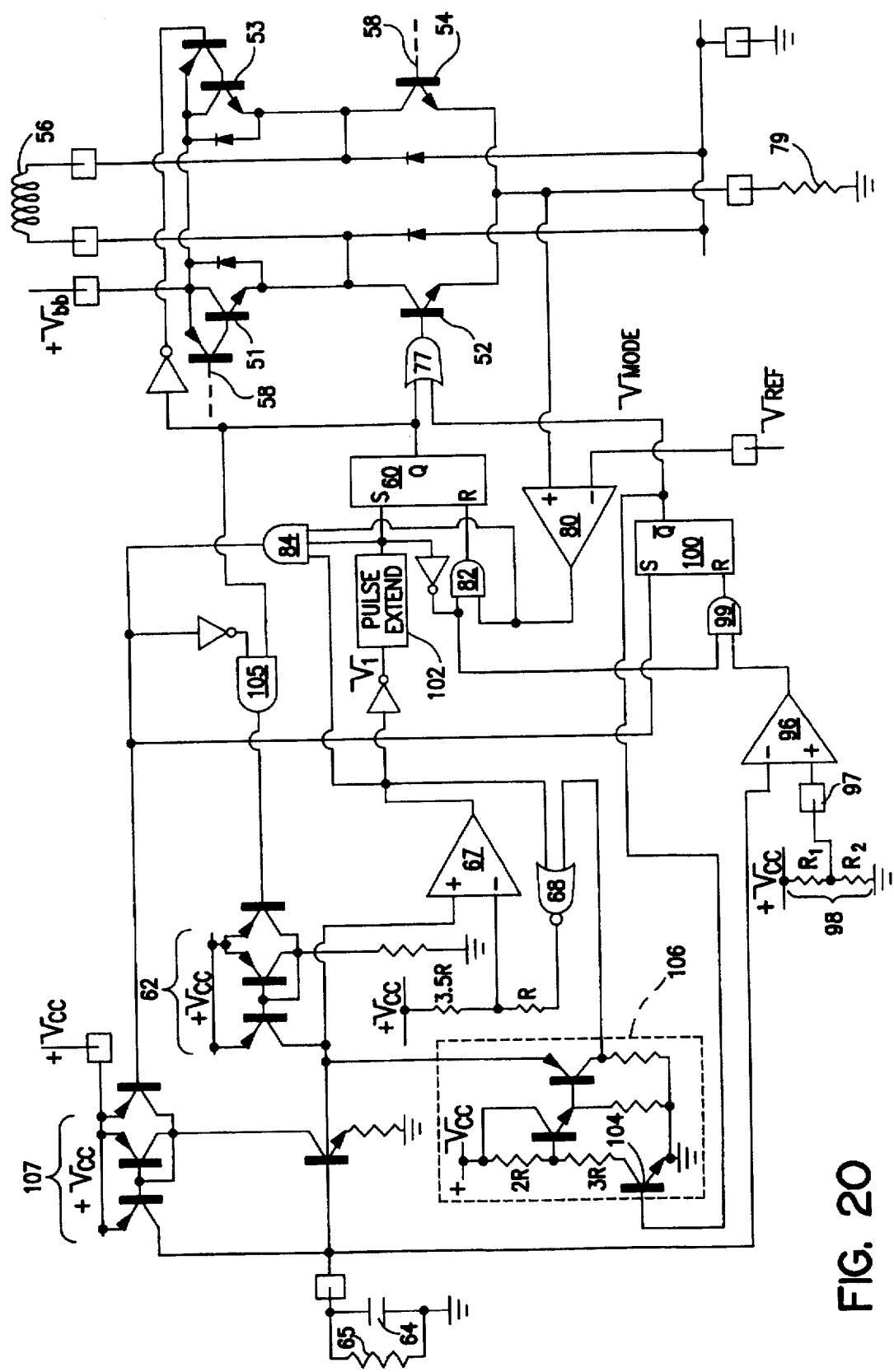
FIG. 20 shows a sixth circuit diagram of bridge driver of this invention with a PWM controller providing a fixed off-time with a fixed slow-decay off-time portion and an adaptive fast-decay off-time portion.

The PWM bridge driver of FIG. 20 has the same circuit as that of FIG. 17 except having no sample comparator for establishing a sample time during the rise in $V_{RC}$, and except for an addition of a pulse-extend circuit 102 with an invertor connected to its output, a AND gate 105, a transistor switch 104 in the oscillator-latch circuit 106, a invertor connected to the output of and gate 84. At time $t_1$, V1 goes high and thus the pulse-extend output goes high and the PWM latch 60 is set thereby enabling the output drivers and current source 62.

Figure 21A:
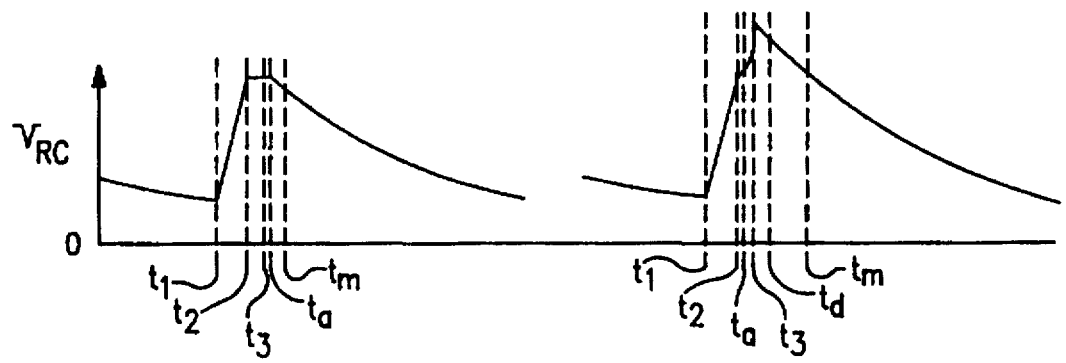
FIGS. 21a and 21b show, respectively waveforms of the timing-capacitor voltage $V_{RC}$, and the load current $I_L$, in the circuit of FIG. 20.

Referring to FIG. 21a, when $V_{RC}$ rises at time $t_2$ to the voltage at which the clamp circuit 106 turns on, the output of NOR gate 68 switches the resistor divider connected to comparator 67 causing comparator 67 to go high and thus V1 to go low. The pulse extend output remains high for several microseconds after the time that V1 goes low and this delay sets the sample time for the system, namely from time $t_2$ to $t_3$. The pulse extend circuit may be implemented with transistor switching delays or set by the charging delay of a small capacitor contained in the integrated circuit.

Figure 21B:
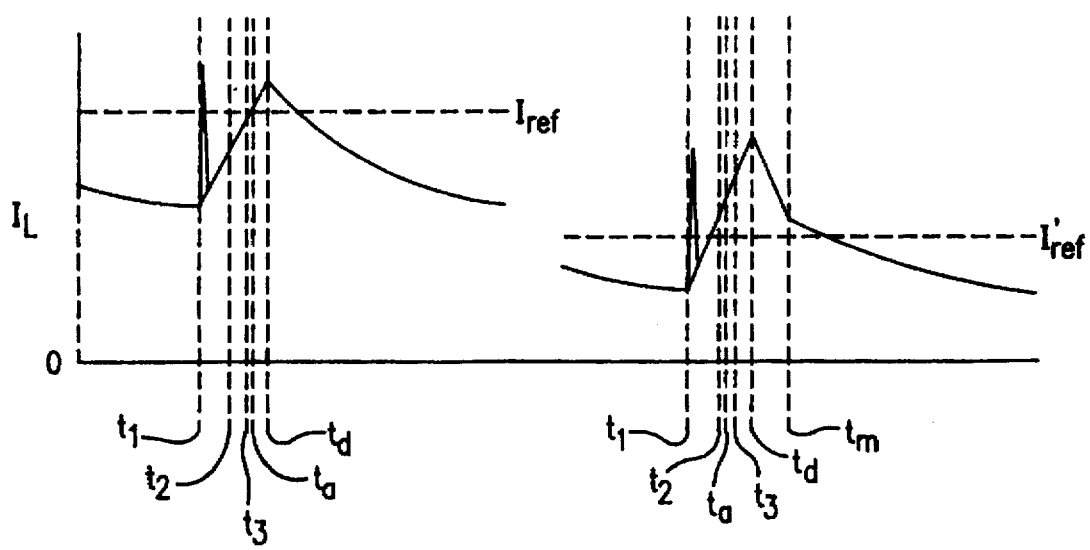

Referring to FIG. 21b, if during the time sample time from $t_2$ to $t_3$, the output of the current sense comparator 80 goes high at time $t_a$ then the output of AND gate 84 goes high producing a type A detector signal that sets latch 100. When latch 100 is set the Q bar output of latch 100 goes low and thus transistor 104 in the clamp circuit 106 is disabled. Also as a result of AND gate 84 going high, the current source 107 is enabled and AND gate 105 disables the current source 62. The current source 107 charges the capacitor 64 for the duration of the type A detector signal, namely from time $t_a$ until time $t_3$.

Because of circuit delays, the chopped driver transistors turn off and load current $I_L$ begins to decay at time $t_d$ after time $t_a$.

When at time $t_3$ the pulse extend signal goes low the current sense comparator is already high so that AND gate 82 will reset the PWM latch 60 and Q will go low. When at time $t_3$ the pulse extend signal goes low the current sense comparator is already high so that AND gate 82 will reset the PWM latch 60 and Q will go low. Because Q bar of latch 100 is low the driving transistors 52 and 53 are both disabled at time $t_3$ resulting in four quadrant PWM mode decay beginning at time $t_3$. Also at time $t_2$ the current sources 107 and 62 are disabled by AND gates 84 and 105 respectively. The capacitor 64 is discharged by resistor 65 from time $t_3$ until the beginning of the next PWM cycle. When at time $t_m$ the voltage on capacitor 65 drops below the voltage set by resistor divider 98 then the comparator 96 resets the latch 100 and thus the Q bar output signal turns on the sink driver 52 and the clamp circuit 106. The driver then remains in two quadrant PWM mode until the beginning of the next PWM cycle which occurs when the voltage on capacitor 64 decays to less than the voltage set by the resistor divider connected to NOR gate 68.

Typically as is the case illustrated in FIG. 21, the voltage on the resistor divider 98 is set to be nearly equal to the clamp voltage of the clamp circuit 106. Because the peak voltage that capacitor 64 is charged to is a function of the pulse width of the type A detector signal which is in turn a function of the degree to which current is being poorly regulated, and because the amount of off-time that the circuit spends in four quadrant PWM decay mode is also a function of the peak voltage that capacitor 64 is charged to, then the amount of off-time that the circuit spends in four quadrant PWM decay mode is a function of the degree to which current is being poorly regulated. Thus the circuit in FIG. 20 has the advantage over the previously discussed circuits that the average amount of time spent in four quadrant decay mode is only as long as is required to maintain good current regulation. This reduces the ripple current in the load resulting in better current regulation and less heating in the load. The use of the non linear current source 107 improves audible noise, if the present, by reducing subharmonic content in the load current that can occur at half the PWM frequency.

Figure 22:
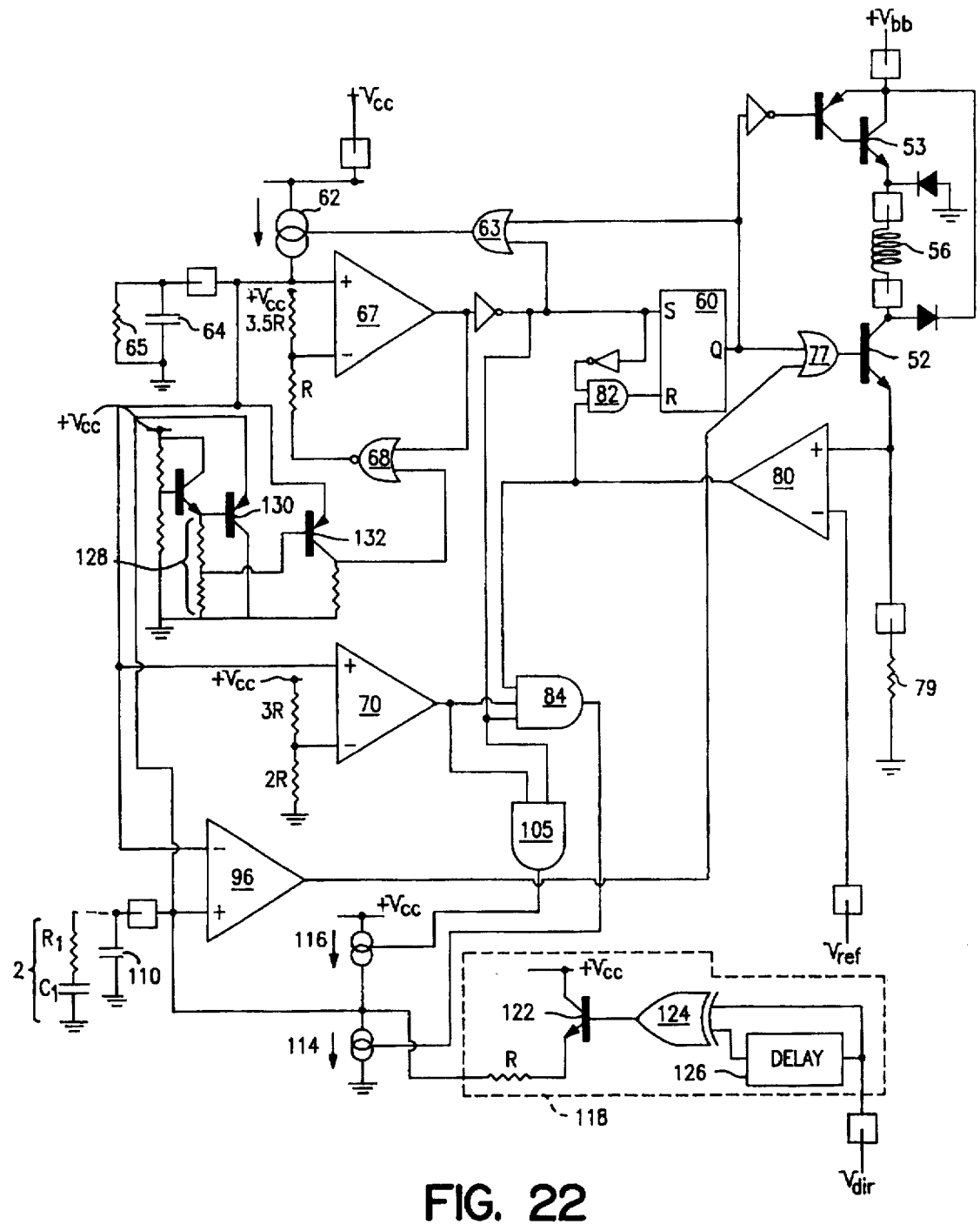
FIG. 22 shows a seventh circuit diagram of a bridge driver of this invention with providing a fixed off-time and an adaptive ratio of slow decay to fast-decay off-time portions, which ratio is a function of the width of a not_reg pulse.

The PWM bridge driver of FIG. 22 has the same circuit as that of FIG. 6b except for the addition of a mode comparator 96 with one input connected to a device terminal which is in turn connected to external mode-allocation capacitor 110 and optional compensation capacitor and series resistor 112. Also added is switched current source 116 which is connected to the output of added AND gate 105. Also added is switched current source 114 which is connected to the output of AND gate 84. Also added to the clamp circuit are transistor 130 and resistor divider 128. Also added is an optional reset circuit 118 comprised of a delay circuit 126, exclusive OR gate 124 and transistor switch 122 with a current limiting resistor in series with the emitter.

Resistor divider 128 functions to set the voltage on the base of transistor 132 to a slightly lower voltage, typically 20 mV, than the base of transistor 130. As a result transistor 130 clamps the charging of mode-allocation capacitor 110 to a voltage slightly higher than the voltage that transistor 132 clamps the charging of capacitor 64. The output of AND gate 84 produces a type A detector signal.

In the case that the load current can be well regulated by two quadrant PWM then the output of AND gate 84 will always be low and thus current source 114 will be off. AND gate 105 will produce a high output for the duration of the sample time and a low output at all other times. The high output pulses cause current source 116 to charge the compensation components connected to the positive input of the mode comparator 96 until their voltage is clamped by transistor 130. Because this clamp voltage is higher than the voltage that capacitor 64 is clamped at then the output of comparator 96 will be positive causing the output of OR gate 77 to be high and thus the driving transistor 52 to remain on during the pwm off time. Thus as long as the load current is well regulated the type A detector signal will remain low and the PWM control circuit will remain in two quadrant mode.

When the load current becomes poorly regulated, AND gate 84 will produce high output pulses during the sample time that will have a width that is proportional to the degree to which the current is being poorly regulated. The high pulses from AND gate 84 cause the current source 114 to be switched on there by discharging mode-allocation capacitor 110. Current source 114 is set to be twice the magnitude of current source 116 so that if the type A detector signal is high for the half the duration of the sample time then the current and pulse width product of the current sources 116 and 114 will be equal and the net effect on the voltage on the compensation components will thus be zero. When a greater degree of poor current regulation is present then the type A detector signal will be high for a larger percentage of the sample time which will cause the voltage on the compensation components to decrease, conversely when a lesser degree of poor current regulation is present then the type A detector signal will be high for a smaller percentage of the sample time which will cause the voltage on the compensation components to increase.

When the value of the voltage on the compensation components is lower than the clamp voltage for the capacitor 64 then at the beginning of the off time for each PWM cycle the output of the mode comparator 96 will be low and thus both driving transistors 53 and 52 will be turned off resulting in four quadrant decay mode.

During the off time when the voltage on capacitor 64 discharges to below the voltage on the compensation components then comparator 96 will go high and driving transistor 52 will turn on resulting in two quadrant decay mode for the remainder of the off time.

The value of mode-allocation capacitor 110 is typically chosen in relation to the current sources 114 and 116 to allow a limited amount of change in voltage in a given PWM cycle. Thus the compensation components set the bandwidth of the system to control the ratio of two quadrant to four quadrant decay during the PWM off time. The optional series resistor and capacitor compensation components 112 allow the bandwidth and stability of the two/four quadrant mode control circuit to be increased at the cost of additional external component count.

In some cases, as in the case of microstepping with a stepper motor, the BEMF voltage of the load will require the PWM current control system to apply a large percentage of four quadrant decay to maintain good current regulation. In this case if the Vdir input is used to reverse the direction of load current then a large amount of four-quadrant fast-decay operation will not be required to regulate load current because the BEMF voltage is now inverted with respect to the desired load current direction and thus it now aids the circuit in maintaining good current regulation. In such a case in the absence of circuit 118 then four quadrant decay will unnecessarily be applied during the off time for several PWM cycles before the bandwith of the control system allows the percentage of four quadrant decay to be reduced to zero. In such a case circuit 118 may be used to generate a pull up current pulse of sufficient magnitude to charge the compensation components to the clamp voltage. During a change in polarity of the Vdir input delay circuit 126 causes the inputs to exclusive OR gate 124 to be different for a length of time equal to the delay time. This results in a high output pulse that turns on transistor 122 thereby charging the compensation components through the series limiting resistor 118.

The circuit of FIG. 22 has the advantage that the load current has no subharmonic content and thus a low PWM frequency may be used without generating audible noise. In addition only the minimum amount of four quadrant decay is applied and thus the ripple in the load current is minimized resulting in less heating in the load. Circuit 22 has the disadvantage of increased complexity and additional component count.

Figure 23A:
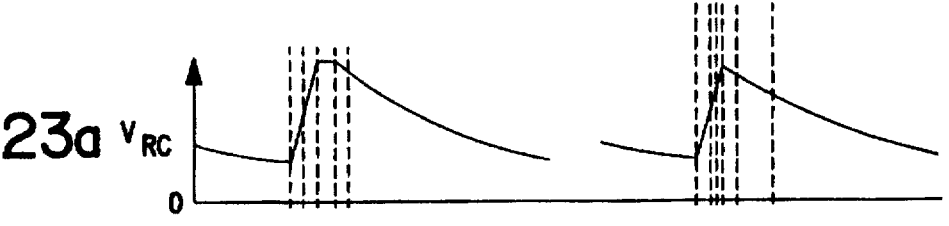
FIGS. 23a, 23b and 23c show, respectively, waveforms of the timing-capacitor voltage $V_{RC}$, of the mode-allocation-capacitor (110) voltage V4, and of the load current $I_L$, in the circuit of FIG. 22.
Figure 23B:
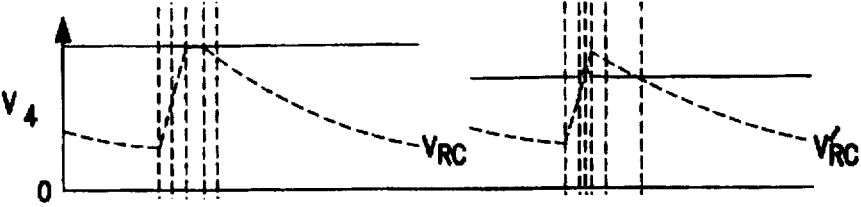
Figure 23C:
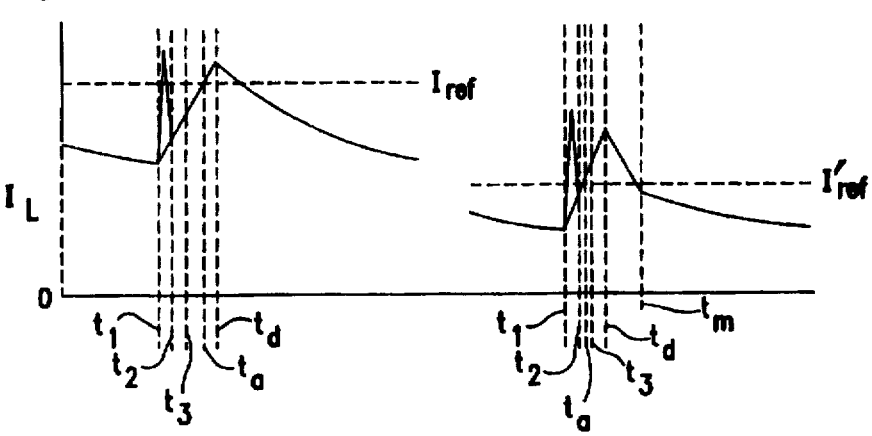

For the circuit of FIG. 22, the FIGS. 23a, 23b and 23c show, respectively, the timing capacitor voltage $V_{RC}$, the voltage V4 on the mode-allocation capacitor 110, and the load current $I_L$, for a first PWM period (left as shown) in which the circuit operates in two quadrant PWM decay mode only and a second PWM period (right as shown) in which the circuit operates in four quadrant PWM mode from time $t_3$ to $t_m$ and operates in two quadrant PWM decay mode from time $t_m$ until the end of the PWM period.

Figure 24:
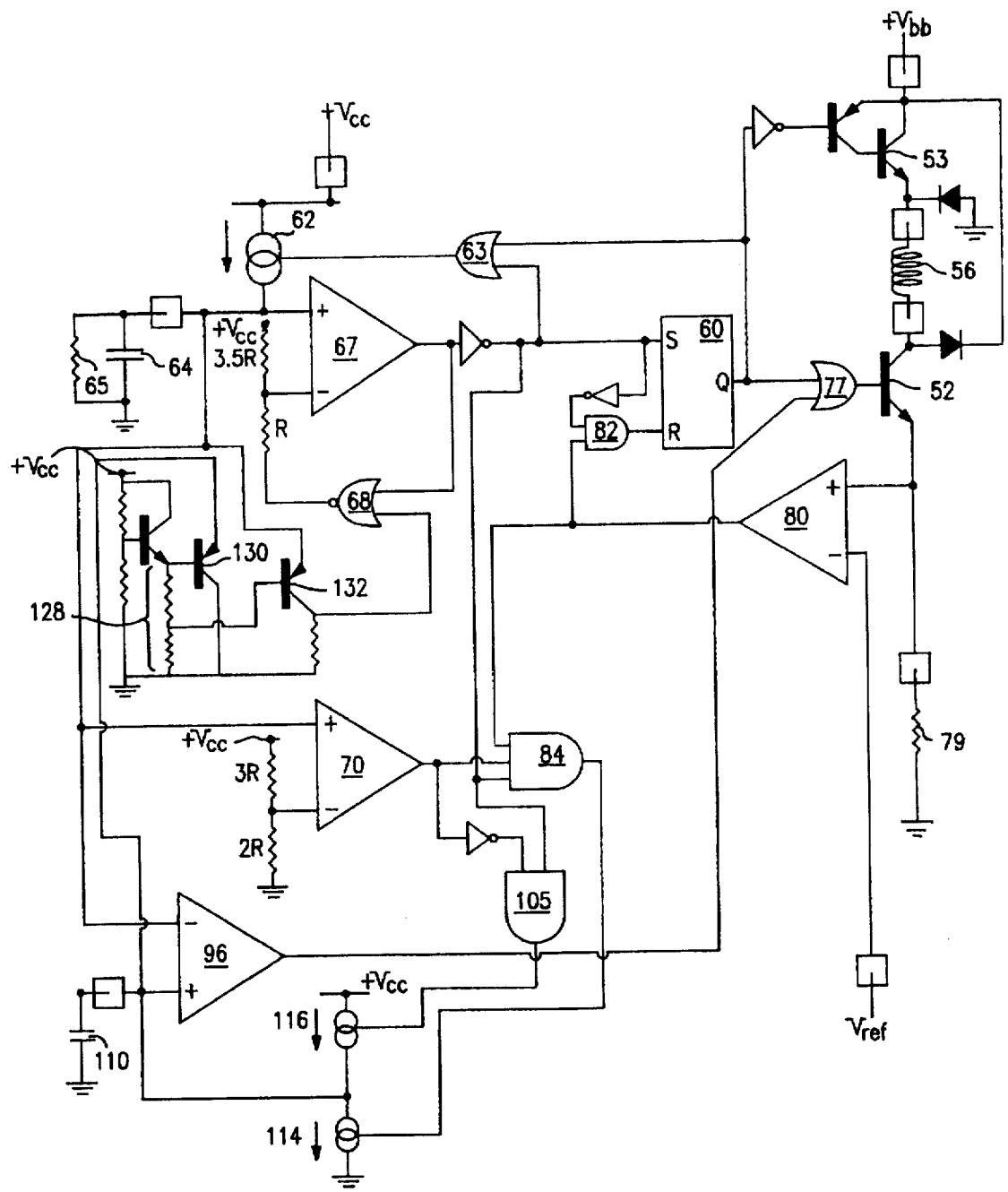
FIG. 24 shows an eighth circuit diagram of bridge driver of this invention with providing a fixed frequency PWM control, and an adaptive ratio of slow decay to fast-decay off-time portions, which ratio is a function of the width of a not_reg pulse.

The PWM bridge driver of FIG. 24 has the same circuit as that of FIG. 22 except having no reset circuit 118 or optional compensation components 112. Also the direct connection between comparator 70 and AND gate 105 has been removed and a new connection is made from the inverted output of comparator 70 to the input of AND gate 105.

At the beginning of each PWM cycle during the blanking time, namely from $t_1$ to $t_2$, the set input to the PWM latch 60 and the inverted output of the sample comparator 70 will both be high resulting in the output of AND gate 105 being high and thus current source 116 being on. In the circuit of FIG. 24 the value of capacitor 110 and current source 116 are chosen to ensure that the voltage on capacitor 110 can always be charged to the clamp voltage during the time from $t_1$ to $t_2$ during which the current source 116 is on.

During the sample time from $t_2$ to $t_3$ AND gate 84 will produce a type A detector signal. If the current is being well regulated then the output of AND gate 84 will remain low during the sample time and capacitor 110 as in the case of circuit 22 will remain at a voltage above the voltage on capacitor 64 causing the mode comparator output to remain high thus keeping the device in two quadrant PWM mode for the remainder of the off time.

If the type A detector signal goes high during the sample time then current source 114 will turn on for the duration of the detector signal pulse width there by partially discharging the mode-allocation capacitor 110. Thus at time $t_3$ the voltage on capacitor 110 will be less than the voltage on capacitor 64 resulting in mode comparator 96 being low and thus both driving transistors 53 and 52 will be turned off at the beginning of the PWM off time $t_3$ resulting in four quadrant decay mode. During the off time when at time $t_m$ the voltage on capacitor 64 discharges to below the voltage on mode-allocation capacitor 110 then comparator 96 will go high and driving transistor 52 will turn on resulting in two quadrant decay mode for the remainder of the PWM off time.

Thus on a cycle by cycle basis the PWM controller applies a percentage of four quadrant decay that is to a degree proportional to the degree to which the current is poorly regulated. This results in lower load current ripple than in the case of the circuit of FIG. 17 and faster transient response to a abrupt change in $V_{ref}$ than in the case of the circuit of FIG. 22. The circuit has the disadvantage of somewhat increased complexity as compared to the circuit of FIG. 17 and increased subharmonic content and thus possible audible noise as compared to the circuit in FIG. 22.

Figure 25:
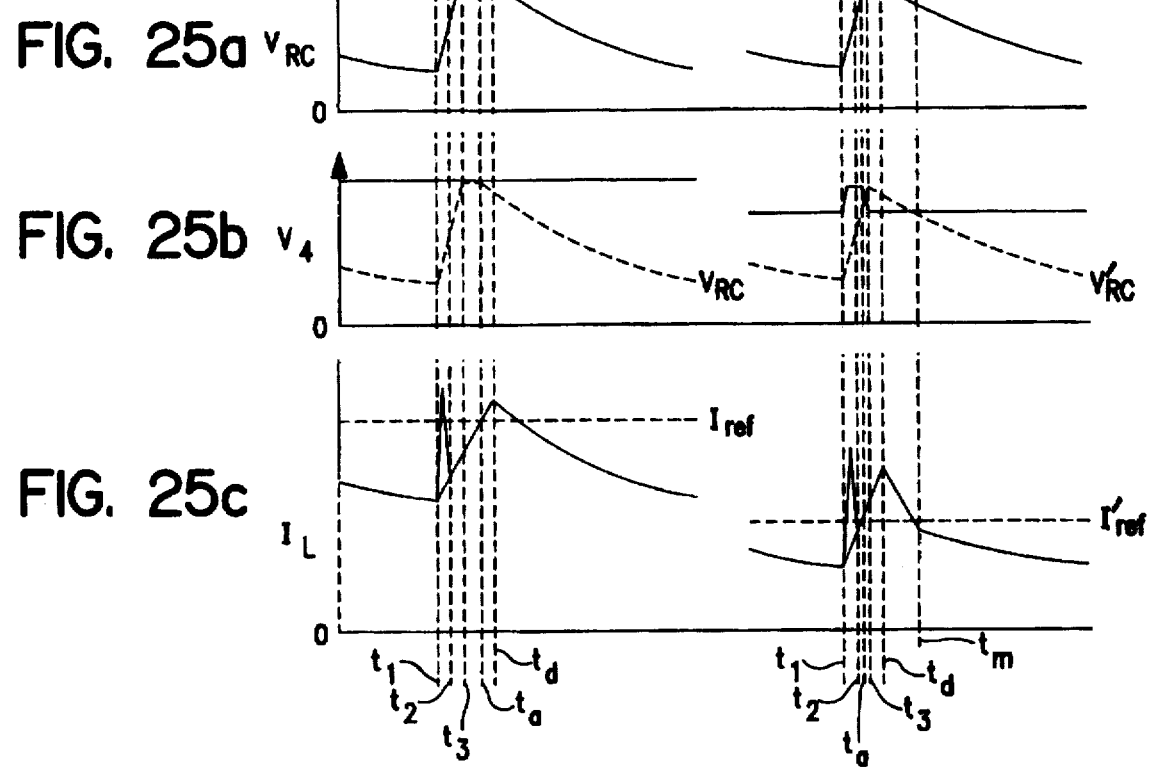
FIGS. 25a, 25b and 25c show, respectively, waveforms of the timing-capacitor voltage $V_{RC}$, of the mode-allocation-capacitor (110) voltage V4, and of the load current $I_L$, in the circuit of FIG. 24.

For the circuit of FIG. 24, the FIGS. 25a, 25b and 25c show the voltage on the capacitor 110 and the load current respectively for a first PWM period in which the circuit operates in two quadrant PWM decay mode only and a second PWM period in which the circuit operates in four quadrant PWM mode from time $t_3$ to $t_m$ and operates in two quadrant PWM decay mode from time $t_m$ until the end of the PWM period.

Figure 26:
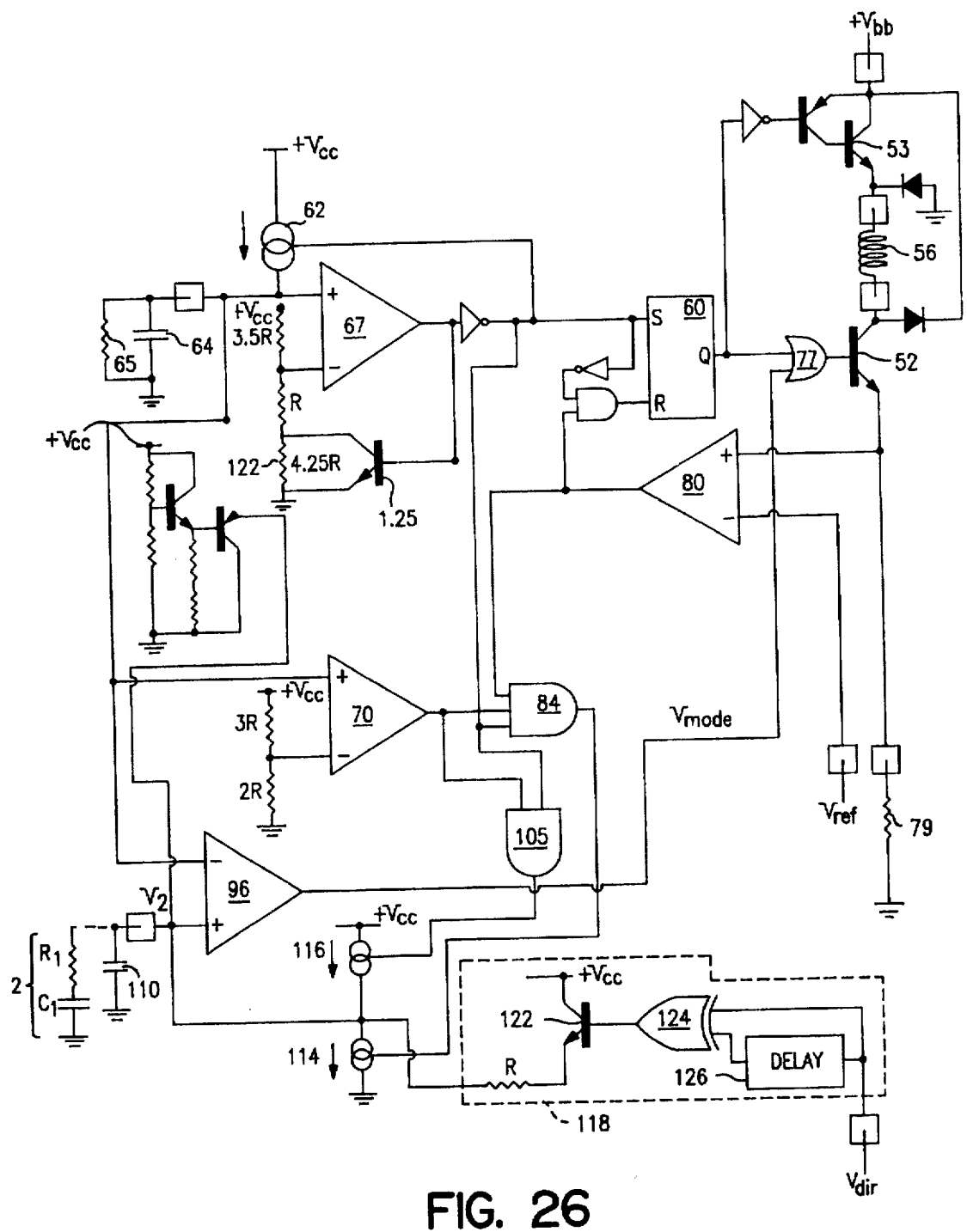
FIG. 26 shows a ninth circuit diagram of bridge driver of this invention with providing a fixed PWM frequency and an adaptive ratio of slow decay to fast-decay off-time portions, which ratio is a function of the width of a not_reg pulse.

The PWM bridge driver of FIG. 26 has the same circuit as that of FIG. 22 except for the removal of NOR gate 68, OR gate 63, clamp circuit resistor divider 128, transistor 132 and the resistor connected to the collector of transistor 132. Added to the circuit are resistor 122 and transistor 125. A new connection is made between the base of transistor 125 and the output of comparator 67. A new connection is also made between the inverted output of comparator 67 and the switched current source 62.

For the circuit of FIG. 26 prior to time $t_1$ the output of comparator 67 is high and thus transistor 125 is on causing the resistor divider on the negative input of comparator 67 to set the voltage on the negative input of comparator 67 to 0.22 Vcc volts. When at time $t_1$ the voltage on capacitor 64 decays to less than 0.22 Vcc volts then the output of comparator 67 goes low which turns off transistor 125 and thus the resistor divider raises the voltage on the negative input to the comparator 67 to 0.6 Vcc volts. Also at time $t_1$ the inverted output of comparator 67 causes the current source 62 to turn on. During the changing of capacitor 64 the PWM control circuitry operates identically to FIG. 22 to control the setting of the PWM latch 60 and the operation of the PWM mode control circuitry. When at time 3 the voltage on capacitor 64 exceeds 0.6 Vcc volts then the output of comparator 67 will go low regardless of the state of the current sense comparator 67. Thus the circuit now operates in a fixed frequency PWM mode where the short charge time and long discharge time of capacitor 64 control the fixed PWM frequency. This is in contrast to the circuit of FIG. 22 where the discharge time of capacitor 64 controls the off time of the PWM control to a fixed value.

For the circuit of FIG. 26, the FIGS. 27a, 27b and 27c show the voltage on the mode-allocation capacitor 110 and the load current respectively for a first PWM period in which the circuit operates in two quadrant PWM decay mode only and a second PWM period in which the circuit operates in four quadrant PWM mode from time $t_3$ to $t_m$ and operates in two quadrant PWM decay mode from time $t_m$ until the end of the PWM period.

Figure 28:
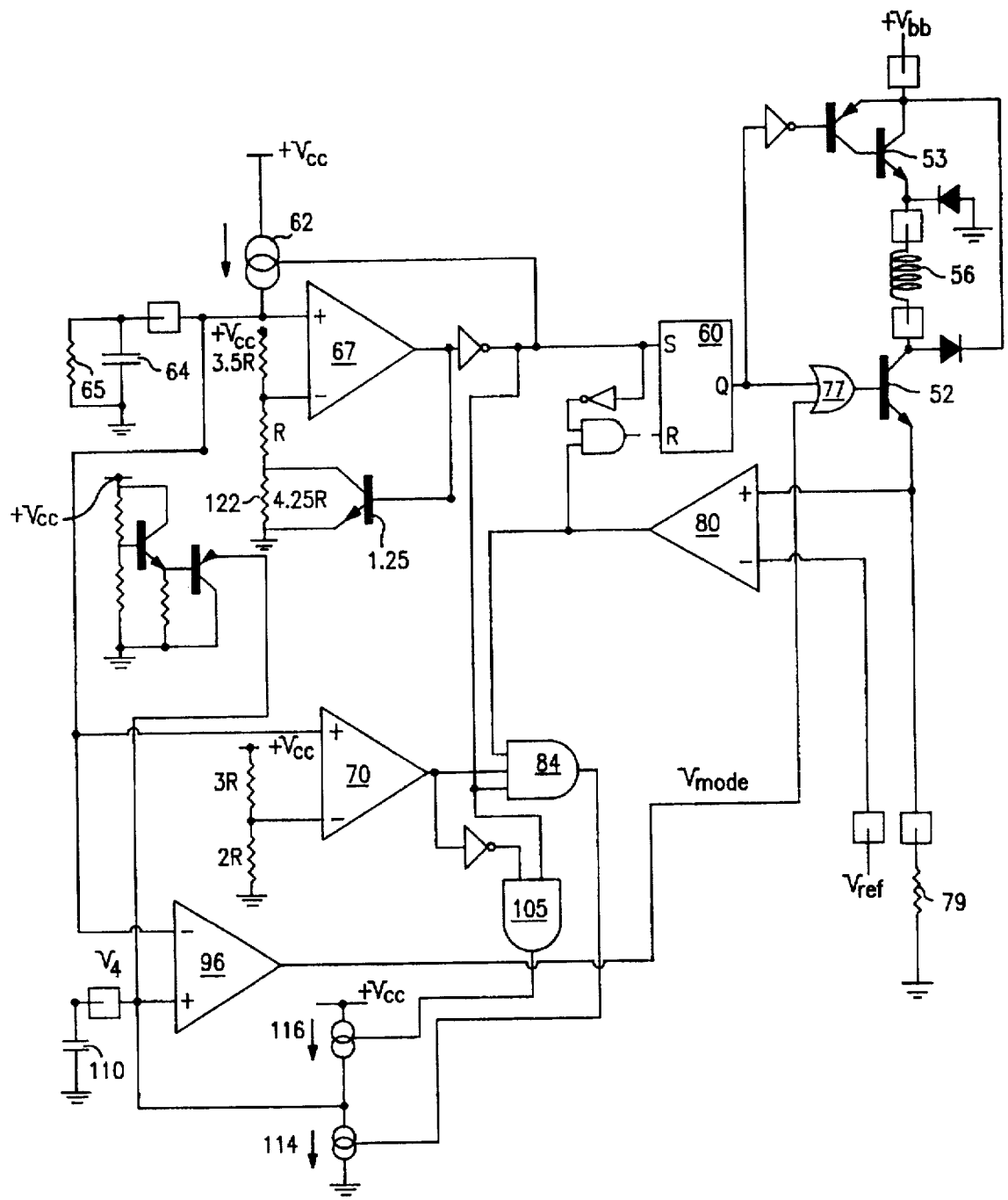
FIG. 28 shows a tenth circuit diagram of bridge driver of this invention providing an adaptive ratio of slow decay to fast-decay off-time portions using cumulative over-current signals.

The PWM bridge driver of FIG. 28 has the same circuit as that of FIG. 24 except for the removal of NOR gate 68, OR gate 63, clamp circuit resistor divider 128, transistor 132 and the resistor connected to the collector of transistor 132. Added to the circuit are resistor 122 and transistor 12.4. A new connection is also made between the inverted output of comparator 67 and the switched current source 62. the circuit of FIG. 28 prior to time $t_1$ the output of comparator 67 is high and thus transistor 125 is on causing the resistor divider on the negative input of comparator 67 to set the voltage on the negative input of comparator 67 to 0.22 volts. When at time $t_1$ the voltage on capacitor 64 decays to less than 0.22 volts then the output of comparator 67 goes low which turns off transistor 125 and thus the resistor divider raises the voltage on the negative input to the comparator 67 to 0.6 Vcc volts. Also at time $t_1$ the inverted output of comparator 67 causes the current source 62 to turn on. During the changing of capacitor 64 the PWM control circuitry operates identically to FIG. 22 to control the setting of the PWM latch 60 and the operation of the PWM mode control circuitry. When at time $t_3$ the voltage on capacitor 64 exceeds 0.6 Vcc volts then the output of comparator 67 will go low regardless of the state of the current sense comparator 67. thus the circuit now operates in a fixed frequency PWM mode where the short charge time and long discharge time of capacitor 64 control the fixed PWM frequency. This is in contrast to the circuit of FIG. 24 where the discharge time of capacitor 64 controls the off time of the PWM control to a fixed value.

For the circuit of FIG. 28, the FIGS. 29a, 29b and 29c show the voltage on the mode-allocation capacitor 110 and the load current respectively for a first PWM period (left as shown) in which the circuit operates in two quadrant PWM decay mode only and a second PWM period (right as shown) in which the circuit operates in four quadrant PWM mode from time $t_3$ to $t_m$ and operates in two quadrant PWM decay mode from time $t_m$ until the end of the PWM period.

One of the goals of the circuit in FIG. 24 is to allow the user to control the timing of the integrated circuit by selecting a small number of external components. In an integrated circuit such as that in FIG. 24, the small amount of digital logic required to implement the timing functions allows the device to be fabricated cost effectively under current market conditions with a standard bipolar wafer fabrication process However, given the rapid evolution of wafer processing technology the timing functions for generating the set time, sample time and off-time or PWM frequency for the circuits of FIGS. 29 and 28 may in the future be more cost effectively implemented with CMOS digital timing logic or a combination of CMOS digital logic and software. Such an integrated circuitry would typically be fabricated with more complex BiCMOS or BCD process technology. Thus it is obvious that the circuits in FIGS.24 and 28 may also have their timing functions determined by logic and digital counters running off a common high frequency clock signal. In such a system the timing of the digital counters may by programmed by the user via a parallel or serial data buss from a microprocessor or microcontroller that is a part of, or not a part of, the integrated circuit.

What is claimed is:

1. A pulse width modulated (PWM) bridge including four driver transistors, a pair of bridge load terminals to which an inductive load may be connected, and a load-current sensing transducer for producing a sense voltage that is directly related to the bridge load current; and a sense-comparator having one input connected to said sensing transducer and having another input to which a driver-control reference voltage may be applied for producing at time $t_a$ a pulse at the output of the sense-comparator when the sense voltage exceeds the applied reference voltage, wherein the improvement comprises:

a PWM bridge-control circuit means capable of operating said PWM bridge in either a four quadrant control mode or a in two quadrant control mode, said PWM bridge-control circuit means connected to the output of said sense-comparator and having an output connected to a gating element of at least one of said driver transistors for repeatedly producing at said gating element of said at least one driver-transistor a gating pulse initiated at time $t_1$ for turning on said one driver transistor for a first portion of each PWM period, the second and remaining portion of each PWM period being a load-current decay portion;

a sample-time logic means connected to said PWM bridge-control circuit for producing logic pulses that include a first logic-level transition at time $t_2$ after $t_1$ during the first portion of the PWM period, and producing a second logic-level transition at time $t_3$ after $t_2$, to define a sample time $t_2$ to $t_3$;

a not_regulating pulse generator means connected to said sample-time logic means and to said sense-comparator output, and having a mode-control output, for producing a not_regulating pulse at said mode-control output during the sample-time in each PWM period when the load current rises to exceed the level at which the sense voltage exceeds the driver-control reference voltage that may be applied to said reference signal input conductor;

a mode control circuit means connected to said PWM bridge-control circuit means and connected to said mode-control output for when a not_regulating pulse occurs during the sample time of a PWM period, operating said bridge driver in the four quadrant mode during an initial part of the ensuing PWM-period decay portion until at a time $t_m$ operating said bridge driver in the two quadrant mode for the remainder of the PWM-period decay portion.

2. The PWM driver circuit of claim 1 wherein said mode control circuit means is additionally for when a not_regulating pulse does not occur in a PWM period, operating said bridge driver in the two quadrant mode for the entire ensuing decay portion of the PWM period.

3. The PWM driver circuit of claim 1 wherein said PWM bridge-control circuit means is comprised of a timer for generating the control pulses; a set-dominant PWM latch having a set input connected to the output of said timer, having a reset input connected to the output of said sense comparator, and having an output connected to said at least one driver-transistor gating element, said PWM latch being for the repeatedly producing at said driver-transistor gating element a gating pulse to turn on and hold on said driver transistor each PWM period for the time interval $t_1$ to at least $t_a$.

4. A (PWM) method for controlling a bridge of the kind having four driver transistors, an inductive load and a driver-control input, said method including producing a sense voltage that is directly related to the bridge load current, applying a driver-control reference voltage to said driver-control input and generating a sense-comparator pulse each time $t_a$ when the sense voltage exceeds the applied reference voltage, wherein the improvement comprises:

repeatedly producing at the gating element of at least one of said driver-transistors a gating pulse initiated at time $t_1$ for turning on said one driver transistor for a first portion of each PWM period, defined as the period from one to a following gating on of said at least one driver transistor at times $t_1$, the second and remaining PWM period portion being the load-current decay portion producing logic pulses in each PWM period that include a first logic-level transition at time $t_2$, occurring after $t_1$ and during the first PWM period portion, and producing a second logic-level transition at time $t_3$ after $t_2$, to define a sample time $t_2$ to $t_3$;

producing a not_regulating pulse during a sample-time, $t_2$ to $t_3$, in each PWM period when during a sample-time the load current rises to exceed the level at which the sense voltage exceeds the driver-control reference voltage that may be applied to said reference signal input conductor;

defining a time $t_m$ within the decay portion of each PWM period; and when a not_regulating pulse occurs during a sample time in a PWM period, operating said bridge driver in a four quadrant mode during an initial part of the ensuing PWM-period decay portion until time $t_m$ and operating said bridge driver in a two quadrant mode for the remainder of the PWM-period decay portion.

5. In the (PWM) method for controlling a bridge of claim 4, when a not_regulating pulse does not occur, operating said bridge driver in the two quadrant mode during the entire decay portion of the PWM period.

6. In the (PWM) method for controlling a bridge of claim 4, said producing a not_regulating pulse includes producing a not_regulating pulse having a width that is directly related to the time interval during which the sense voltage exceeds the driver-control reference voltage.

7. In the (PWM) method for controlling a bridge of claim 6, said defining a time $t_m$ within the decay portion of each PWM period includes setting the time $t_m$ later in the PWM period by an amount that is directly related to the width of the not_regulating pulse, so that for a larger degree of not_regulating, the bridge is operated in the four quadrant mode for a longer time interval during the PWM-period decay portion.

8. In the (PWM) method for controlling a bridge of claim 6, said defining a time $t_m$ within the decay portion of each PWM period includes setting the time $t_m$ later in the PWM period by an amount that is inversely related to the value of $V_{ref}$.

* * * * *